(12) United States Patent
Eim et al.

(10) Patent No.: US 10,719,210 B2
(45) Date of Patent: Jul. 21, 2020

(54) MOBILE TERMINAL AND METHOD FOR OPERATING THE SAME

(71) Applicant: LG ELECTRONICS INC., Seoul (KR)

(72) Inventors: Sanghyun Eim, Seoul (KR); Junho Seo, Seoul (KR); Jieun Yoon, Seoul (KR); Soyeon Yim, Seoul (KR); Jieun Lee, Seoul (KR); Kyungrak Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/147,271

(22) Filed: Sep. 28, 2018

(65) Prior Publication Data
US 2019/0265871 A1   Aug. 29, 2019

(30) Foreign Application Priority Data
Feb. 26, 2018  (KR) .................. 10-2018-0023144

(51) Int. Cl.
*G06F 3/0484* (2013.01)
*H04M 1/725* (2006.01)
*G06F 3/0482* (2013.01)
*G06F 9/451* (2018.01)

(52) U.S. Cl.
CPC ........ *G06F 3/04845* (2013.01); *G06F 3/0482* (2013.01); *G06F 3/0484* (2013.01); *G06F 3/04842* (2013.01); *H04M 1/7258* (2013.01); *H04M 1/72522* (2013.01); *H04M 1/72583* (2013.01); *G06F 9/451* (2018.02)

(58) Field of Classification Search
CPC combination set(s) only.
See application file for complete search history.

(56) References Cited

U.S. PATENT DOCUMENTS

| 2011/0176670 | A1* | 7/2011 | Kaplan | H04M 1/72566 |
| | | | | 379/210.01 |
| 2013/0275531 | A1* | 10/2013 | Hahm | H04W 4/12 |
| | | | | 709/206 |

(Continued)

FOREIGN PATENT DOCUMENTS

| EP | 2840488 | 2/2015 |
| WO | 2010038985 | 4/2010 |

OTHER PUBLICATIONS

European Patent Office Application Serial No. 18196754.8, Search Report dated Jun. 4, 2019, 12 pages.

*Primary Examiner* — Hien L Duong
(74) *Attorney, Agent, or Firm* — Lee, Hong, Degerman, Kang & Waimey

(57) ABSTRACT

The present invention relates to a mobile terminal and a method of operating the same. A mobile terminal according to an embodiment of the present invention includes a display to display screen information thereon, a user input unit to receive a capture command, and a controller to capture the screen information according to the capture command and detect an operation associated with the captured screen information. In addition, the controller detects an entry into a capture utilization mode, and displays a menu varied based on an operation detected after the capture command together with the captured screen information in the capture utilization mode.

15 Claims, 25 Drawing Sheets

(56) References Cited

U.S. PATENT DOCUMENTS

| | | | |
|---|---|---|---|
| 2014/0240440 A1* | 8/2014 | Seo | H04L 51/04 |
| | | | 348/14.03 |
| 2015/0095855 A1* | 4/2015 | Bai | G06F 3/017 |
| | | | 715/863 |
| 2016/0026309 A1* | 1/2016 | Wu | G09G 5/346 |
| | | | 345/174 |
| 2016/0205203 A1* | 7/2016 | Choi | H04L 67/16 |
| | | | 709/222 |
| 2016/0231876 A1* | 8/2016 | Wang | G06F 3/0482 |
| 2016/0283073 A1 | 9/2016 | Fu et al. | |
| 2017/0098159 A1* | 4/2017 | Sharifi | G06N 20/00 |
| 2017/0134567 A1* | 5/2017 | Jeon | H04L 41/22 |
| 2018/0129657 A1* | 5/2018 | Guest | G06F 3/04842 |
| 2018/0335903 A1* | 11/2018 | Coffman | G06F 3/0414 |
| 2019/0188013 A1* | 6/2019 | Krishna | G06N 20/00 |
| 2019/0258371 A1* | 8/2019 | Huang | G06F 3/0484 |

* cited by examiner

MOBILE TERMINAL AND METHOD FOR OPERATING THE SAME

CROSS-REFERENCE TO RELATED APPLICATION

Pursuant to 35 U.S.C. § 119(a), this application claims the benefit of earlier filing date and right of priority to Korean Application No. 10-2018-0023144, filed on Feb. 26, 2018, the contents of which are all hereby incorporated by reference herein in its entirety.

BACKGROUND OF THE INVENTION

1. Field of the Invention

The present invention relates to a mobile terminal capable of capturing screen information, and a method of controlling the same.

2. Background of the Disclosure

Terminals may be divided into mobile/portable terminals and stationary terminals according to mobility. Also, the mobile terminals may be classified into handheld types and vehicle mount types according to whether or not a user can directly carry.

Mobile terminals have become increasingly more functional. Examples of such functions include data and voice communications, capturing images and video via a camera, recording audio, playing music files via a speaker system, and displaying images and video on a display unit. Some mobile terminals include additional functionality which supports electronic game playing, while other terminals are configured as multimedia players. Specifically, in recent time, mobile terminals can receive broadcast and multicast signals to allow viewing of video or television programs As it becomes multifunctional, a mobile terminal can be allowed to capture still images or moving images, play music or video files, play games, receive broadcast and the like, so as to be implemented as an integrated multimedia player.

On the other hand, the terminal can capture a screen output on a display. Accordingly, a currently-displayed screen or information to be memorized can be stored immediately. Currently, however, there are limitations on executable functions, such as saving, sharing, and editing, in utilizing a captured screen.

SUMMARY OF THE DISCLOSURE

Accordingly, one aspect of the present invention is to provide a mobile terminal with improved usability of a captured screen and a method of operating the same.

Another aspect of the present invention is to provide a mobile terminal capable of fast executing a next operation predicted with respect to utilization of a captured screen according to an operation made after capturing, and a method of operating the same.

To this end, a mobile terminal according to an embodiment of the present invention may include a display to display screen information thereon, a user input unit to receive a capture command, and a controller to capture the screen information according to the capture command and detect an operation associated with the captured screen information. The controller may detect an entry into a capture utilization mode and display a menu that is varied based on the sensed operation on the display together with the captured screen information in a capture utilization mode.

Further scope of applicability of the present invention will become apparent from the detailed description given hereinafter. However, the detailed description and specific examples, while indicating preferred embodiments of the invention, are given by illustration only, since various changes and modifications within the spirit and scope of the invention will become apparent to those skilled in the art from this detailed description.

DETAILED DESCRIPTION OF THE PREFERRED EMBODIMENTS

Figure 1A:
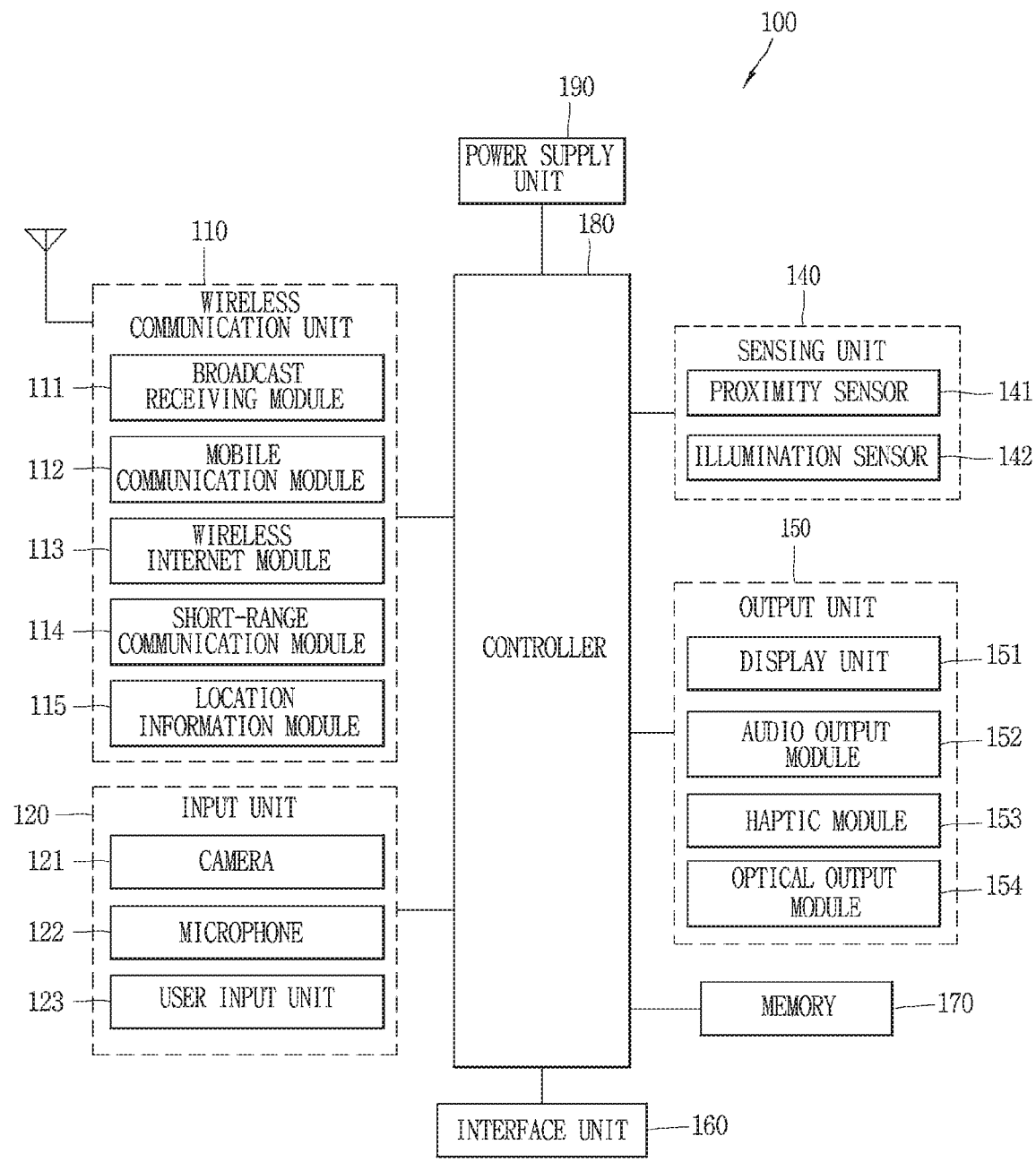
FIG. 1A is a block diagram of a mobile terminal in accordance with one exemplary embodiment of the present invention.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit"

may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
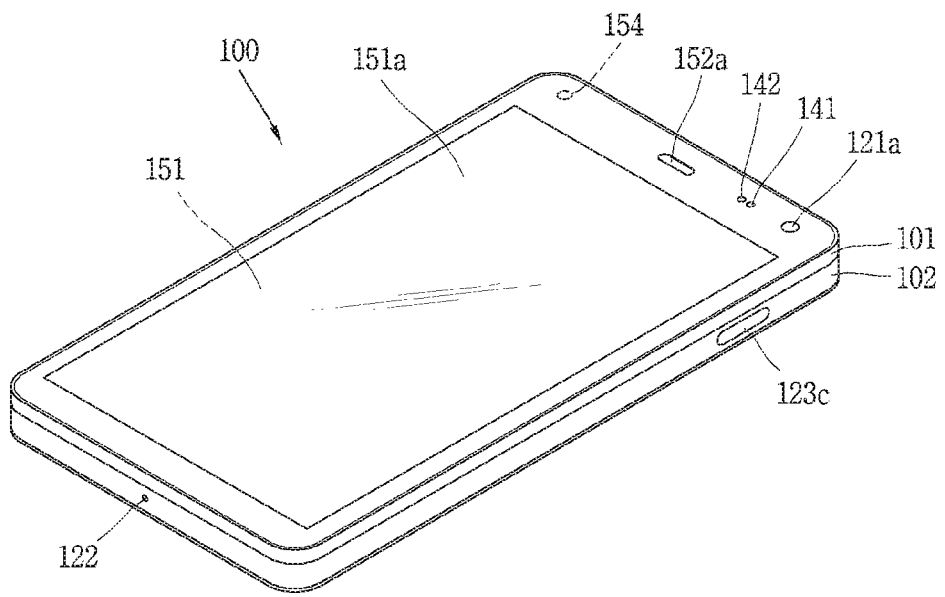
FIGS. 1B and 1C are conceptual views illustrating one example of a mobile terminal according to the present invention, viewed from different directions.
Figure 1C:
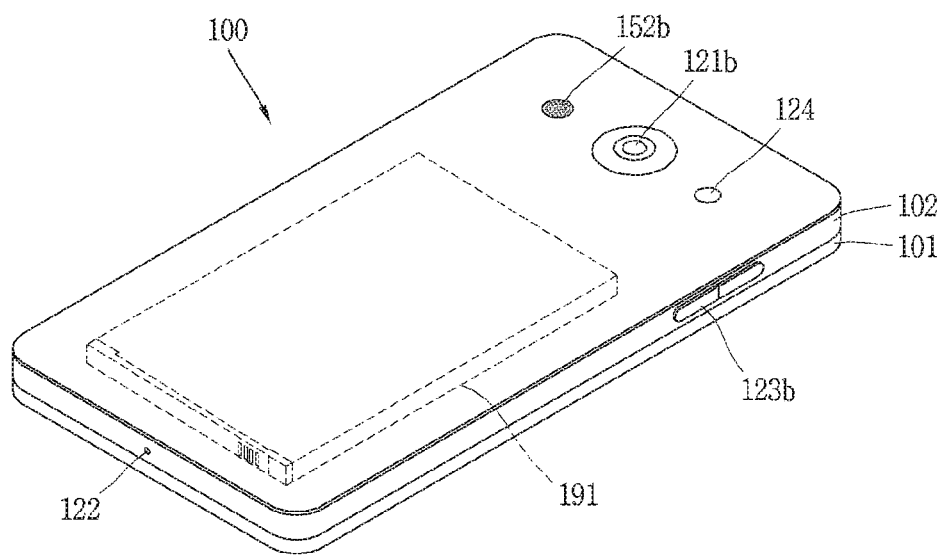

Referring to FIGS. 1A to 1C, FIG. 1A is a block diagram of a mobile terminal in accordance with one exemplary embodiment of the present invention, and FIGS. 1B and 1C are conceptual views illustrating one example of a mobile terminal, viewed from different directions.

The mobile terminal 100 may be shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

In more detail, the wireless communication unit 110 may typically include one or more modules which permit communications such as wireless communications between the mobile terminal 100 and a wireless communication system, communications between the mobile terminal 100 and another mobile terminal, or communications between the mobile terminal 100 and an external server. Further, the wireless communication unit 110 may typically include one or more modules which connect the mobile terminal 100 to one or more networks.

The wireless communication unit 110 may include one or more of a broadcast receiving module 111, a mobile communication module 112, a wireless Internet module 113, a short-range communication module 114, and a location information module 115.

The input unit 120 may include a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) may be obtained by the input unit 120 and may be analyzed and processed according to user commands.

The sensing unit 140 may typically be implemented using one or more sensors configured to sense internal information of the mobile terminal, the surrounding environment of the mobile terminal, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The mobile terminal disclosed herein may be configured to utilize information obtained from one or more sensors of the sensing unit 140, and combinations thereof.

The output unit 150 may typically be configured to output various types of information, such as audio, video, tactile output, and the like. The output unit 150 may be shown having at least one of a display unit 151, an audio output module 152, a haptic module 153, and an optical output module 154. The display unit 151 may have an inter-layered structure or an integrated structure with a touch sensor in order to implement a touch screen. The touch screen may function as the user input unit 123 which provides an input interface between the mobile terminal 100 and the user and simultaneously provide an output interface between the mobile terminal 100 and a user.

The interface unit 160 serves as an interface with various types of external devices that are coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). Application programs may be stored in the memory 170, installed in the mobile terminal 100, and executed by the controller 180 to perform an operation (or function) for the mobile terminal 100.

The controller 180 typically functions to control an overall operation of the mobile terminal 100, in addition to the operations associated with the application programs. The controller 180 may provide or process information or functions appropriate for a user by processing signals, data, information and the like, which are input or output by the aforementioned various components, or activating application programs stored in the memory 170.

Also, the controller 180 may control at least some of the components illustrated in FIG. 1A, to execute an application program that have been stored in the memory 170. In addition, the controller 180 may control at least two of those components included in the mobile terminal to activate the application program.

The power supply unit 190 may be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least part of the components may cooperatively operate to implement an operation, a control or a control method of a mobile terminal according to various embodiments disclosed herein. Also, the operation, the control or the control method of the mobile terminal may be implemented on the mobile terminal by an activation of at least one application program stored in the memory 170.

Hereinafter, description will be given in more detail of the aforementioned components with reference to FIG. 1A, prior to describing various embodiments implemented through the mobile terminal 100.

First, regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules may be utilized to facilitate simultaneous reception of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

The wireless signal may include various types of data depending on a voice call signal, a video call signal, or a text/multimedia message transmission/reception.

The wireless Internet module 113 refers to a module for wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), LTE-advanced (LTE-A) and the like. The wireless Internet module 113 may transmit/receive data according to one or more of such wireless Internet technologies, and other Internet technologies as well.

When the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

Here, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position (or current position) of the mobile terminal. As an example, the location information module 115 includes a Global Position System (GPS) module, a Wi-Fi module, or both. For example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module. If desired, the location information module 115 may alternatively or additionally function with any of the other modules of the wireless communication unit 110 to obtain data related to the position of the mobile terminal. The location information module 115 is a module used for acquiring the position (or the current position) and may not be limited to a module for directly calculating or acquiring the position of the mobile terminal.

Examples of such inputs include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. Meanwhile, the cameras 121 may be arranged in a matrix configuration to permit a plurality of images having various angles or focal points to be input to the mobile terminal 100. Also, the cameras 121 may be located in a stereoscopic arrangement to acquire left and right images for implementing a stereoscopic image.

The microphone 122 processes an external audio signal into electric audio (sound) data. The processed audio data can be processed in various manners according to a function being executed in the mobile terminal 100. If desired, the microphone 122 may include assorted noise removing algorithms to remove unwanted noise generated in the course of receiving the external audio signal.

The user input unit 123 is a component that permits input by a user. Such user input may enable the controller 180 to control operation of the mobile terminal 100. The user input unit 123 may include one or more of a mechanical input element (for example, a mechanical key, a button located on a front and/or rear surface or a side surface of the mobile terminal 100, a dome switch, a jog wheel, a jog switch, and the like), or a touch-sensitive input element, among others. As one example, the touch-sensitive input element may be a virtual key, a soft key or a visual key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like, and generate a corresponding sensing signal. The controller 180 generally cooperates with the sending unit 140 to control operations of the mobile terminal 100 or execute data processing, a function or an operation associated with an application program installed in the mobile terminal based on the sensing signal. The sensing unit 140 may be implemented using any of a variety of sensors, some of which will now be described in more detail.

The proximity sensor 141 refers to a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

When the touch screen is implemented as a capacitance type, the proximity sensor 141 can sense proximity of a pointer relative to the touch screen by changes of an electromagnetic field, which is responsive to an approach of an object with conductivity. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data (or information) according to whether a touch with respect to a point on the touch screen is either a proximity touch or a contact touch.

A touch sensor senses a touch (or a touch input) applied to the touch screen (or the display unit 151) using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

Meanwhile, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches include a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize location information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121, which has been depicted as a component of the input unit 120, typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors (TRs) at rows and columns to scan content received at the photo sensor using an electrical signal which changes according to the quantity of applied light. Namely, the photo sensor may calculate the coordinates of the physical object according to variation of light to thus obtain location information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

Also, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 may receive audio data from the wireless communication unit 110 or output audio data stored in the memory 170 during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceives, or otherwise experiences. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal therethrough. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a flash memory type, a hard disk type, a solid state disk (SSD) type, a silicon disk drive (SDD) type, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control operations relating to application programs and the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provides internal power and supply the appropriate power required for operating respective elements and components included in the wearable device 100 under the control of the controller 180. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring to FIGS. 1B and 1C, the disclosed mobile terminal 100 includes a bar-like terminal body. However, the mobile terminal 100 may alternatively be implemented in any of a variety of different configurations. Examples of such configurations include watch type, clip-type, glasses-type, or a folder-type, flip-type, slide-type, swing-type, and swivel-type in which two and more bodies are combined with each other in a relatively movable manner, and combinations thereof. Discussion herein will often relate to a particular type of mobile terminal. However, such teachings with regard to a particular type of mobile terminal will generally apply to other types of mobile terminals as well.

Here, considering the mobile terminal 100 as at least one assembly, the terminal body may be understood as a conception referring to the assembly.

The mobile terminal 100 will generally include a case (for example, frame, housing, cover, and the like) forming the appearance of the terminal. In this embodiment, the case is formed using a front case 101 and a rear case 102. Various electronic components are interposed into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. In this case, a rear cover 103 is shown covering the electronic components, and this cover may be detachably coupled to the rear case 102. Therefore, when the rear cover 103 is detached from the rear case 102, the electronic components mounted on the rear case 102 are exposed to the outside.

As illustrated, when the rear cover 103 is coupled to the rear case 102, a side surface of the rear case 102 may partially be exposed. In some cases, upon the coupling, the rear case 102 may also be completely shielded by the rear cover 103. Meanwhile, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this case, a mobile terminal 100 having a uni-body is formed in such a manner that synthetic resin or metal extends from a side surface to a rear surface.

Meanwhile, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include a display unit 151, first and second audio output module 152a and 152b, a proximity sensor 141, an illumination sensor 142, an optical output module 154, first and second cameras 121a and 121b, first and second manipulation units 123a and 123b, a microphone 122, an interface unit 160, and the like.

Hereinafter, as illustrated in FIGS. 1B and 1C, description will be given of the exemplary mobile terminal 100 in which the front surface of the terminal body is shown having the display unit 151, the first audio output module 152a, the proximity sensor 141, the illumination sensor 142, the optical output module 154, the first camera 121a, and the first manipulation unit 123a, the side surface of the terminal body is shown having the second manipulation unit 123b, the microphone 122, and the interface unit 160, and the rear surface of the terminal body is shown having the second audio output module 152b and the second camera 121b.

However, those components may not be limited to the arrangement. Some components may be omitted or rearranged or located on different surfaces. For example, the first manipulation unit 123a may be located on another surface of the terminal body, and the second audio output module 152b may be located on the side surface of the terminal body other than the rear surface of the terminal body.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

The display module 151 may include at least one of a liquid crystal display (LCD), a thin film transistor-LCD (TFT LCD), an organic light-emitting diode (OLED), a flexible display, a three-dimensional (3D) display and an e-ink display.

The display unit 151 may be implemented using two display devices, according to the configuration type thereof. For instance, a plurality of the display units 151 may be arranged on one side, either spaced apart from each other, or these devices may be integrated, or these devices may be arranged on different surfaces.

The display unit 151 may include a touch sensor that senses a touch with respect to the display unit 151 so as to receive a control command in a touch manner. Accordingly, when a touch is applied to the display unit 151, the touch sensor may sense the touch, and a controller 180 may generate a control command corresponding to the touch. Contents input in the touch manner may be characters, numbers, instructions in various modes, or a menu item that can be specified.

On the other hand, the touch sensor may be configured in a form of a film having a touch pattern and disposed between a window 151a and a display (not illustrated) on a rear surface of the window, or may be a metal wire directly patterned on the rear surface of the window. Alternatively, the touch sensor may be formed integrally with the display. For example, the touch sensor may be disposed on a substrate of the display, or may be provided inside the display.

In this way, the display unit 151 may form a touch screen together with the touch sensor, and in this case, the touch screen may function as the user input unit (123, see FIG. 1A). In some cases, the touch screen may replace at least some of functions of a first manipulation unit 123a.

The first audio output module 152a may be implemented as a receiver for transmitting a call sound to a user's ear and the second audio output module 152b may be implemented as a loud speaker for outputting various alarm sounds or multimedia playback sounds.

The window 151a of the display unit 151 may include a sound hole for emitting sounds generated from the first audio output module 152a. However, the present invention is not limited thereto, and the sounds may be released along an assembly gap between the structural bodies (for example, a gap between the window 151a and the front case 101). In this case, a hole independently formed to output audio sounds may not be seen or may otherwise be hidden in terms of appearance, thereby further simplifying the appearance of the mobile terminal 100.

The optical output module 154 may be configured to output light for indicating an event generation. Examples of such events may include a message reception, a call signal reception, a missed call, an alarm, a schedule alarm, an email reception, information reception through an application, and the like. When a user has checked a generated event, the controller 180 may control the optical output module 154 to stop the light output.

The first camera 121a may process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion. The first and second manipulation units 123a and 123b may employ any method if it is a tactile manner allowing the user to perform manipulation with a tactile feeling such as touch, push, scroll or the like. The first and second manipulation units 123a and 123b may also be manipulated through a proximity touch, a hovering touch, and the like, without a user's tactile feeling.

The drawings are illustrated on the basis that the first manipulation unit 123a is a touch key, but the present disclosure may not be necessarily limited to this. For example, the first manipulation unit 123a may be configured with a mechanical key, or a combination of a touch key and a push key.

The content received by the first and second manipulation units 123a and 123b may be set in various ways. For example, the first manipulation unit 123a may be used by the user to input a command such as menu, home key, cancel, search, or the like, and the second manipulation unit 123b may be used by the user to input a command, such as controlling a volume level being output from the first or second audio output module 152a or 152b, switching into a touch recognition mode of the display unit 151, or the like.

On the other hand, as another example of the user input unit 123, a rear input unit (not shown) may be disposed on the rear surface of the terminal body. The rear input unit 123c may be manipulated by a user to input a command for controlling an operation of the mobile terminal 100. The content input may be set in various ways. For example, the rear input unit may be used by the user to input a command, such as power on/off, start, end, scroll or the like, controlling a volume level being output from the first or second audio output module 152a or 152b, switching into a touch recognition mode of the display unit 151, or the like. The rear input unit 123c may be implemented into a form allowing a touch input, a push input or a combination thereof.

The rear input unit 123c may be disposed to overlap the display unit 151 of the front surface in a thickness direction of the terminal body. As one example, the rear input unit 123c may be disposed on an upper end portion of the rear surface of the terminal body such that a user can easily manipulate it using a forefinger when the user grabs the terminal body with one hand. However, the present invention may not be limited to this, and the position of the rear input unit 123c may be changeable.

When the rear input unit 123c is disposed on the rear surface of the terminal body, a new user interface may be implemented using the rear input unit. Also, the aforementioned touch screen or the rear input unit may substitute for at least part of functions of the first manipulation unit 123a located on the front surface of the terminal body. Accordingly, when the first manipulation unit 123a is not disposed on the front surface of the terminal body, the display unit 151 may be implemented to have a larger screen.

On the other hand, the mobile terminal 100 may include a finger scan sensor which scans a user's fingerprint. The controller may use fingerprint information sensed by the finger scan sensor as an authentication means. The finger scan sensor may be installed in the display unit 151 or the user input unit 123.

The microphone 122 may be configured to receive the user's voice, other sounds, and the like. The microphone 122 may be provided at a plurality of places, and configured to receive stereo sounds.

The interface unit 160 may serve as a path allowing the mobile terminal 100 to interface with external devices. For example, the interface unit 160 may be at least one of a connection terminal for connecting to another device (for example, an earphone, an external speaker, or the like), a port for near field communication (for example, an Infrared DaAssociation (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b may be further mounted to the rear surface of the terminal body. The second camera 121b may have an image capturing direction, which is substantially opposite to the direction of the first camera unit 121a.

The second camera 121b may include a plurality of lenses arranged along at least one line. The plurality of lenses may be arranged in a matrix form. The cameras may be referred to as an 'array camera.' When the second camera 121b is implemented as the array camera, images may be captured in various manners using the plurality of lenses and images with better qualities may be obtained.

The flash 124 may be disposed adjacent to the second camera 121b. When an image of a subject is captured with the camera 121b, the flash 124 may illuminate the subject.

The second audio output module 152b may further be disposed on the terminal body. The second audio output module 152b may implement stereophonic sound functions in conjunction with the first audio output module 152a, and may be also used for implementing a speaker phone mode for call communication.

At least one antenna for wireless communication may be disposed on the terminal body. The antenna may be embedded in the terminal body or formed in the case. For example, an antenna which configures a part of the broadcast receiving module 111 (see FIG. 1A) may be retractable into the terminal body. Alternatively, an antenna may be formed in a form of film to be attached onto an inner surface of the rear cover 103 or a case including a conductive material may serve as an antenna.

The terminal body is provided with a power supply unit 190 (see FIG. 1A) for supplying power to the mobile terminal 100. The power supply unit 190 may include a batter 191 which is mounted in the terminal body or detachably coupled to an outside of the terminal body.

The battery 191 may receive power via a power cable connected to the interface unit 160. Also, the battery 191 may be (re)chargeable in a wireless manner using a wireless charger. The wireless charging may be implemented by magnetic induction or electromagnetic resonance.

On the other hand, the drawing illustrates that the rear cover 103 is coupled to the rear case 102 for shielding the battery 191, so as to prevent separation of the battery 191 and protect the battery 191 from an external impact or foreign materials. When the battery 191 is detachable from the terminal body, the rear case 103 may be detachably coupled to the rear case 102.

An accessory for protecting an appearance or assisting or extending the functions of the mobile terminal 100 may further be provided on the mobile terminal 100. As one example of the accessory, a cover or pouch for covering or accommodating at least one surface of the mobile terminal 100 may be provided. The cover or pouch may cooperate with the display unit 151 to extend the function of the mobile terminal 100. Another example of the accessory may be a touch pen for assisting or extending a touch input onto a touch screen.

Hereinafter, embodiments related to a control method that can be implemented in a mobile terminal configured as above will be described with reference to the accompanying drawings. It will be apparent to those skilled in the art that the present invention may be embodied in other specific forms without departing from the spirit or essential characteristics thereof.

The controller 180 of the mobile terminal 100 according to the embodiment of the present invention including at least one of the components described above captures screen information output to the display unit 151 upon reception of a capture command, and detects a subsequent operation associated with the captured screen information. Thereafter, the controller 180 detects an entry into a capture utilization mode, and displays a menu varied on the basis of the detected subsequent operation, together with the captured screen information.

Here, the menu provided together with the captured screen information may vary depending on what subsequent operation is detected after the capture command. Therefore, the varied menu refers to an execution menu of the next operation which is predicted to be executed after the detected subsequent operation. Further, the varied menu may be varied again based on another subsequent operation if the another subsequent operation is made in the terminal. Since the next operation predicted according to the subsequent operation made after the capture command can be recommended to the user in a form of a menu, utilization of the captured screen information can be maximized.

Hereinafter, operations implemented in a mobile terminal according to the present invention will be described in more detail with reference to FIGS. 2A, 2B, 2C and 2D.

Figure 2A:
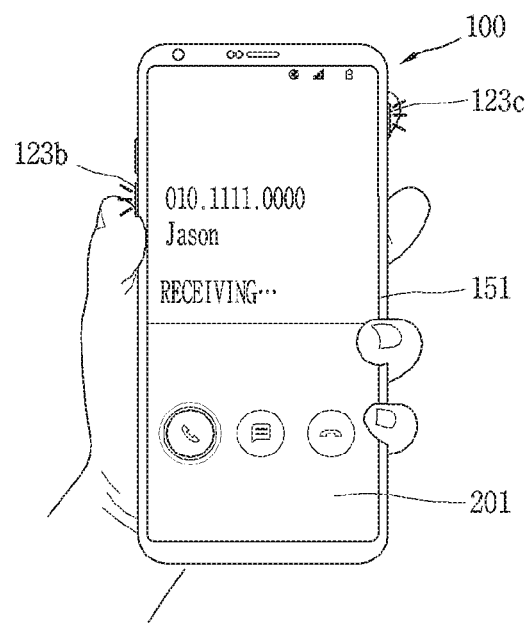
FIGS. 2A, 2B, 2C, and 2D are representative conceptual views illustrating operations implemented in a mobile terminal according to the present invention.

First, referring to FIG. 2A, when a call signal is received through the wireless communication unit 110 of the mobile terminal 100, screen information 201 corresponding to the reception of the call signal is displayed on the display unit 151.

Figure 2B:
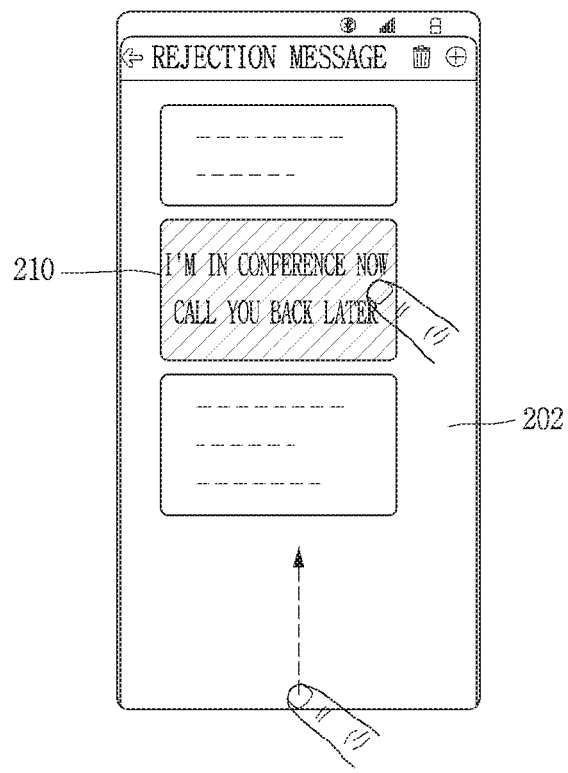

In this instance, if it is difficult to respond to the reception of the call signal, as illustrated in FIG. 2B, a push input may be applied to keys 123b and 123c provided on side surfaces of the mobile terminal 100, to capture the screen information 201. Accordingly, the captured screen information can be generated, and the controller 180 of the mobile terminal 100 can recognize text, images, and other multimedia information included in the captured screen information.

On the other hand, the user may transmit a rejection message without responding to the received call signal. For example, as a drag touch gesture is applied upwardly from a bottom of the screen information 201, a screen 202 in which a rejection message for the received call signal can be selected is displayed as illustrated in FIG. 2B. When a specific rejection message 210 is selected in the displayed screen 202, the selected rejection message 210 is transmitted to an originating terminal of the call signal.

The controller 180 recognizes the transmission of the rejection message 210 as an operation associated with the captured screen information after the capture command, that is, a captured reception screen of the call signal.

At this time, the controller 180 may recognize, in association with the captured screen information, detailed information related to the transmission of the rejection message 210, such as contents of the transmitted message, a counterpart to which the message is transmitted, a transmission time, a transmission result and the like, as well as the message transmission operation.

Figure 2C:
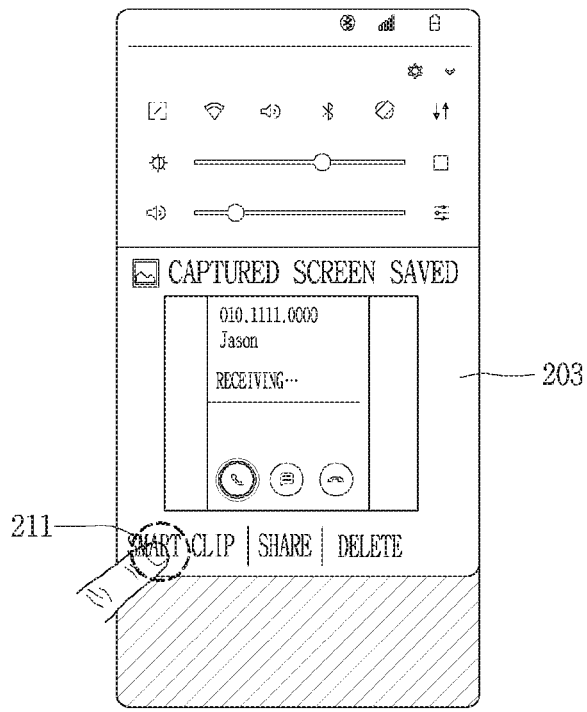

Then, in order to utilize the captured screen information, for example, as illustrated in FIG. 2C, the capture utilization mode may immediately be activated by selecting a smart clip menu 211 with respect to the captured screen information from a notification panel which is output in response to a drag touch gesture applied downward from a top of the display unit 151. However, FIG. 2 illustrates only one example of a way to enter the capture utilization mode, and various related art methods for approaching a captured image may be similarly applied.

Figure 2D:
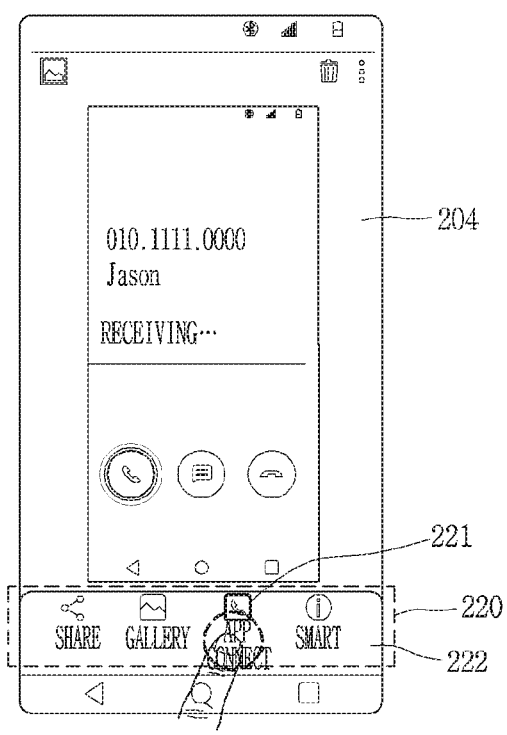

When the entry into the capture utilization mode is detected, as illustrated in FIG. 2D, a menu area 220 subject to the transmission of the rejection message 210 detected after the capture command is displayed along with the captured call signal reception screen 204.

Here, the menu area 220 displays thereon a plurality of function icons that can be executed in association with the captured call signal reception screen 204.

Among the plurality of function icons, a recommendation icon 221 corresponding to a subsequent operation, which is predicted to be performed by the user in association with the transmission of the rejection message 210 detected after the capture command is included. In addition, items corresponding to the predicted subsequent operation may be provided using smart icons 222.

In addition, the plurality of function icons displayed in the menu area 220 may not be limited to limited function icons such as sharing, storing, editing and the like with respect to the captured screen information. For example, the plurality of function icons includes every function related to utilization of information included in the captured screen information, for example, copying, searching or translating text, connecting or executing a corresponding application, and the like.

The recommendation icon 221 may be one or more. For example, in FIG. 2D, both of a phone application connection icon and a smart icon may be the recommendation icon.

In addition, the recommendation icon 221 is displayed to be visually distinguishable from the other function icons included in the menu area 220. Here, displaying to be visually distinguishable indicates highlighting the recommendation icon 221 rather than the other function icons. For example, at least one of a position, a shape, a color, a size, transparency, 3D depth of the recommendation icon 221 within the menu area 220 is different from those of the other function icons.

Referring back to FIG. 2B, since the sentence 'I will contact you after a while' is included as the content of the transmitted rejection message 210, when entering the capture utilization mode, placing a call to the originator (caller, counterpart) of the call signal may be predicted as the user's subsequent operation in association with the captured call signal reception screen 204.

The controller 180 may analyze a content of the subsequent operation, so as to select and provide the phone App connection icon as the recommendation icon 221, as illustrated in FIG. 2D. At this time, the phone App connection icon may be visually highlighted, compared with the other function icons, to induce the user's selection.

When a touch input is applied to the displayed recommendation icon 221, call placing is immediately carried out to the counterpart corresponding to the captured call signal reception screen. Accordingly, the captured screen information may be switched to a call placing screen while leaving the capture utilization mode.

As described above, according to the embodiment of the present invention, a menu which is varied according to situation can be provided upon utilizing a captured screen, in a manner of quickly collecting information to be remembered or memorized using the existing screen capture method and detecting a subsequent operation after capturing, thereby optimizing the utilization of the captured screen.

Figure 3:
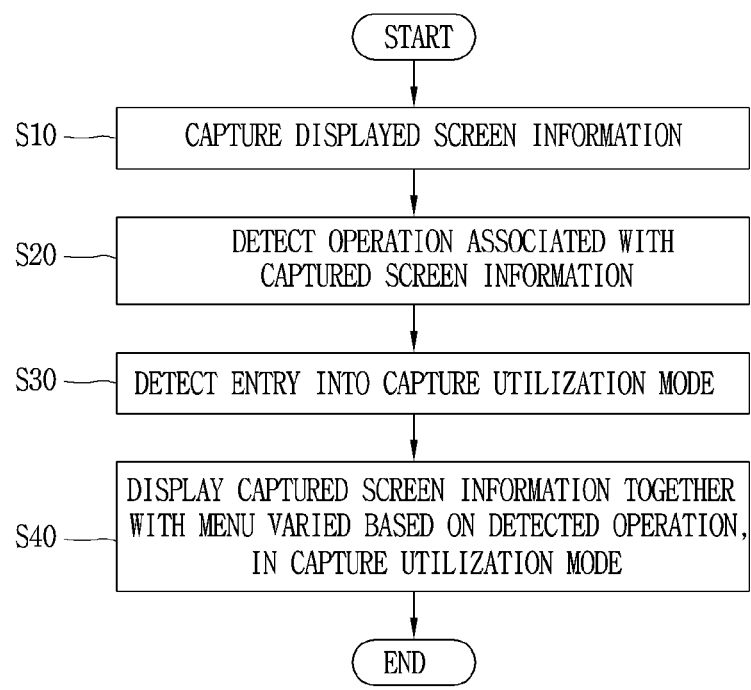
FIG. 3 is a flowchart illustrating an operation implemented in a mobile terminal according to the present invention.

Next, FIG. 3 is a representative flowchart illustrating operations implemented in a mobile terminal according to the present invention.

Referring to FIG. 3, while screen information is displayed on the display unit 151 of the mobile terminal 100, the displayed screen information is captured in response to a reception of a capture command (S10).

Here, a type of screen information is not limited. For example, the screen information may be a home screen or an execution screen of at least one application. For example, an execution screen of an application such as a web browser, a schedule management, an e-mail, document writing or editing, a message, a finance, a social network service (SNS), a gallery or the like may correspond to the screen information. In addition, the screen information may be captured including even an area which is not output to the display unit 151. For example, when the screen information is a web page, even information existing in an area outside an upper/lower end of the display unit 151 may be captured, and an auto scroll may be carried out in a background.

In addition, the capture command may be generated by sensing a predetermined combination of key inputs, a palm touch applied to the display unit 151 having a touch sensor, a preset voice command, and the like in various input manners.

After the generation of the capture command, the mobile terminal 100 detects that a subsequent operation associated with the captured screen information is performed (S20).

Here, the subsequent operation associated with the captured screen information includes not only an operation of the terminal generated through a user input, but also a reception of information, signals, and other events from an external device/external server through the wireless communication unit 110 of the mobile terminal 100. Also, the subsequent operation includes a case where an operation mode associated with the captured screen information is automatically changed according to setting of the mobile terminal 100.

Next, an entry into a capture utilization mode is performed (S30). Here, the entry into the capture utilization mode may be performed by first performing, as aforementioned, a preset touch gesture of outputting the notification panel (for example, a touch gesture dragged from the top to bottom of the display unit 151) and then selecting a smart clip menu for the captured screen information. The subsequent approach may be made at any time in a manner of touching an arbitrary point of an area in which a notification corresponding to the capture utilization mode is displayed on the notification panel because the notification is fixed on the notification panel.

In the capture utilization mode, the controller 180 displays a menu, which has been varied based on the subsequent operation detected after the capture command, together with the captured screen information (S40).

Here, the menu provided together with the captured screen information is varied depending on what subsequent operation is detected after the capture command. Accordingly, the varied menu may refer to a menu icon mapped to the next operation which is predicted to be executed in the capture utilization mode after the detected subsequent operation.

At this time, the menu icon mapped to the predicted next operation is displayed in a recommended form, and the recommended form indicates a form in which the menu icon is visually highlighted as compared with the other provided menu icons.

In addition, the plurality of other menu icons provided together with the highlighted icon may not be limited to limited functions such as sharing, editing, and saving the captured screen information. For example, in the capture utilization mode, a plurality of functions may be mapped to a plurality of different menu icons in the capture utilization mode. Examples of the various functions may include selectively copying text information included in the captured screen information, applying the text information to an execution of another application, or moving to a stage of an application corresponding to the captured screen information.

To this end, when the capture command is received, the controller 180 stores or saves not only an image of the captured screen but also detailed information such as text included in the captured screen, a position of the screen, a corresponding application and the like.

On the other hand, when another subsequent operation occurs in the terminal after entering the capture utilization mode, the menu may be varied again based on the another subsequent operation. Accordingly, if the operation detected after the capture command is in plurality, menus may be configured based on the most recently detected subsequent operation at a current time point of entering the capture utilization mode.

Once the user selects various menu icons or the recommendation menu icon provided in the capture utilization mode, various operations associated with the utilization of the captured screen information can be carried out immediately.

As described above, the next operation which is predicted according to the subsequent operation made after the capture command can be recommended to the user in the form of menu, thereby optimizing the utilization of the captured screen information.

Hereinafter, description will be given in detail of examples of utilizing captured screen information quickly in various manners by way of using a menu varied according to a subsequent operation associated with the captured screen information, with reference to FIGS. 4A, 4B, 4C, 4D, 5A, 5B, 5C, 6A, 6B, 6C and 6D.

In one embodiment, FIGS. 4A, 4B, 4C, and 4D are views illustrating examples in which a varied menu is additionally varied in response to an additional generation of a subsequent operation associated with captured screen information.

When an additional operation associated with captured screen information is additionally detected after displaying the captured screen information and a first menu in the capture utilization mode, the controller 180 of the mobile terminal 100 provides a second menu re-changed based on the detected additional operation in the subsequent capture utilization mode.

Figure 4A:
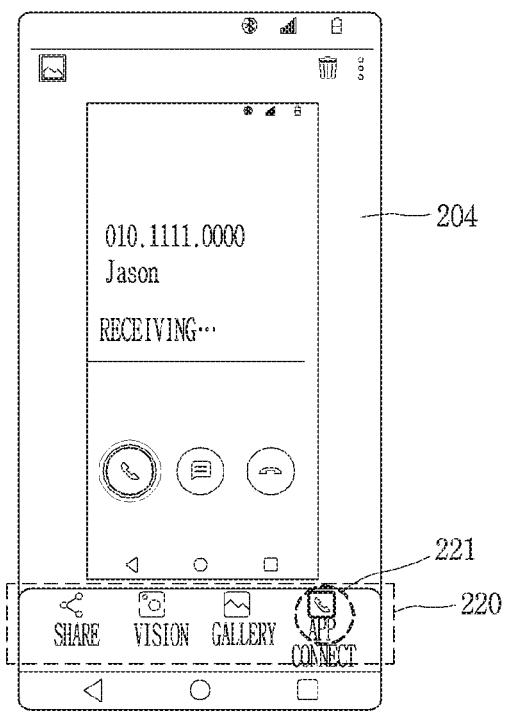
FIGS. 4A, 4B, 4C, 4D, 5A, 5B, 5C, 6A, 6B, 6C and 6D are conceptual views illustrating various embodiments related to providing a varied menu in a capture utilization mode and executing a function corresponding to the menu according to a subsequent operation associated with captured screen information, in a mobile terminal according to the present invention.

In this regard, referring to the capture utilization mode illustrated in FIG. 4A, a phone application connection icon 221 may first be recommended as an operation, which is predicted with respect to an unanswered call signal, within a menu area 220 for a captured call signal reception screen 204.

Figure 4B:
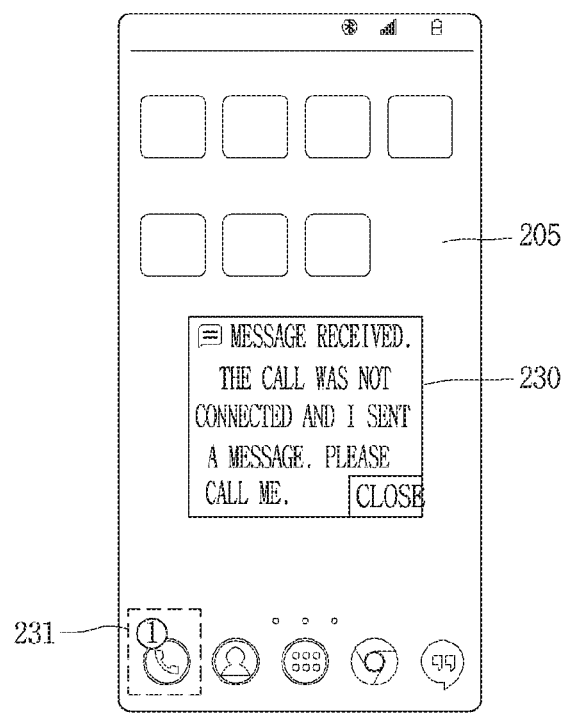

Thereafter, when a message is received from an originator or caller of the unanswered call signal, as illustrated in FIG. 4B, a message reception notification 230 may be displayed in a current screen, for example, a home screen 205 or in a form of a head-up notification. At this time, a notification badge indicating that the call signal has not been answered is not displayed on a phone application icon 231 displayed on a home screen 205. That is, when a capture command is received and the capture utilization mode is entered while the call signal is received, it is determined that the user has recognized that the call signal was not answered and thus such notification is removed/blocked.

Meanwhile, an example of a subsequent operation associated with the captured screen information may include a case where an event occurs in an application associated with the captured screen information. According to this, there is no user's intentional operation, but as illustrated in FIG. 4B, the arrival of the message from the originator of the unanswered call signal is also the subsequent operation associated with the captured screen information.

Afterwards, when entering the capture utilization mode again, the configuration, arrangement and recommendation of icons displayed in the menu area 220 change. For example, referring to FIG. 4C, the controller 180 determines the confirmation of the content of the message received from the originator of the unanswered call signal as the predicted next operation and designates a message application connection icon as a recommendation icon 221 for output. In addition, a smart icon for executing the associated operation may be provided as a second recommendation icon 222.

That is, the recommendation icon in the menu area 220 is changed from the phone application connection icon to the message application connection icon at the time point of the reception of the message.

On the other hand, in one example, an additional operation associated with the captured screen information includes a case where a specific function is executed in response to a selection of the recommendation icon, i.e., the first menu (e.g., the phone application connection icon) or the second menu (e.g., the message application connection icon) in the capture utilization mode.

Figure 4C:
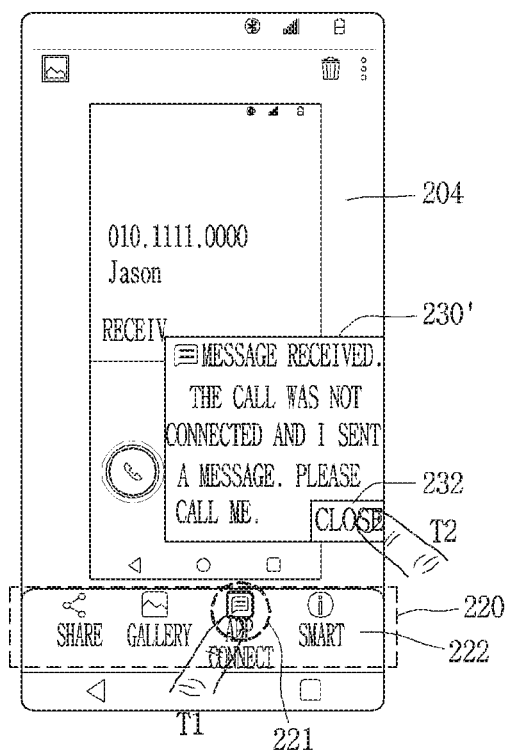

In this regard, as illustrated in FIG. 4C, when a touch is applied to the recommended message application connection icon 221 in the menu area 220 (T1), a window 230' including the content of the received message may be displayed in a manner of overlapping the captured screen information 204. When the user touches a close icon 232 after confirming the content of the received message (T2), the window 230' disappears from the captured screen information 204.

Figure 4D:
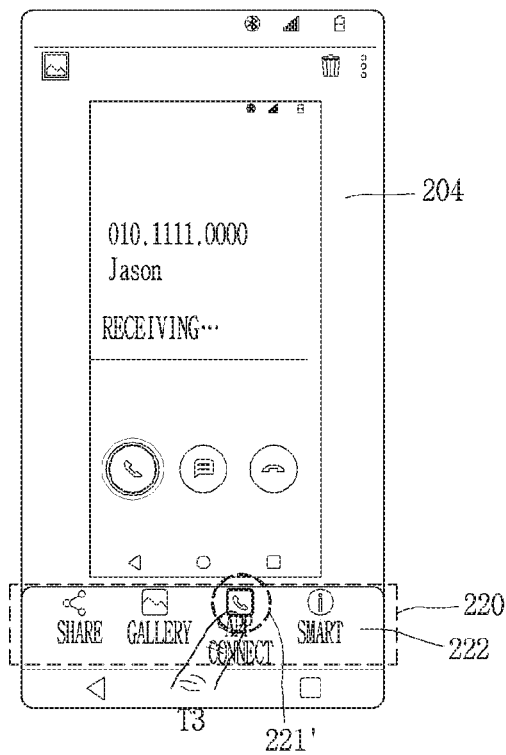

Then, the recommendation icon in the menu area 220 is changed in response to the content of the received message being checked. Accordingly, as illustrated in FIG. 4D, a phone application connection icon 221' is designated again as the recommendation icon. When a touch is applied to the recommended phone application connection icon 221' (T3), call placing is immediately performed.

In another embodiment, FIGS. 6A, 6B, 6C, and 6D illustrate an example of utilizing captured screen information when the user actively performs a subsequent operation after a capture command.

In a capture utilization mode, a menu provided together with the captured screen information includes a plurality of function icons. At this time, the plurality of function icons, as aforementioned, may not be limited to limited function icons such as sharing of the captured screen information, image storage, editing, and the like. Examples of the function icons include all functions related to the utilization of information included in the captured screen information, for example, copying, searching or translating text, voice prompting, connecting, executing or applying a corresponding application, and the like.

Accordingly, when a first menu provided together with captured screen information is changed to a second menu, function icons recommended in the first menu and function icons recommended in the second menu are different from each other.

Figure 6A:
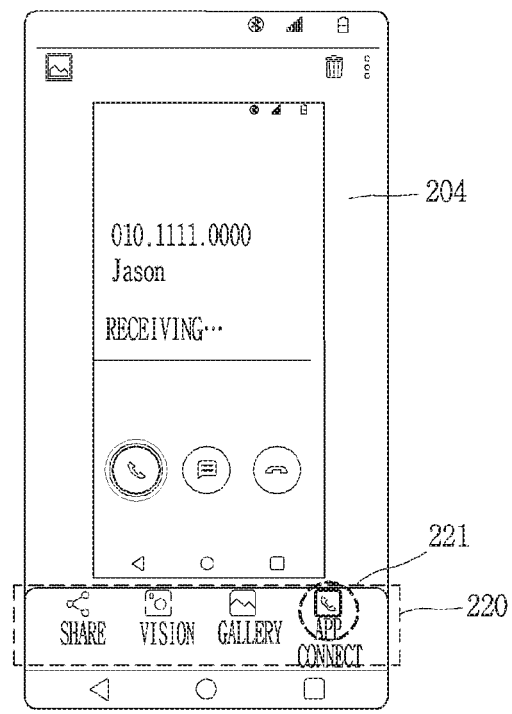
Figure 6B:
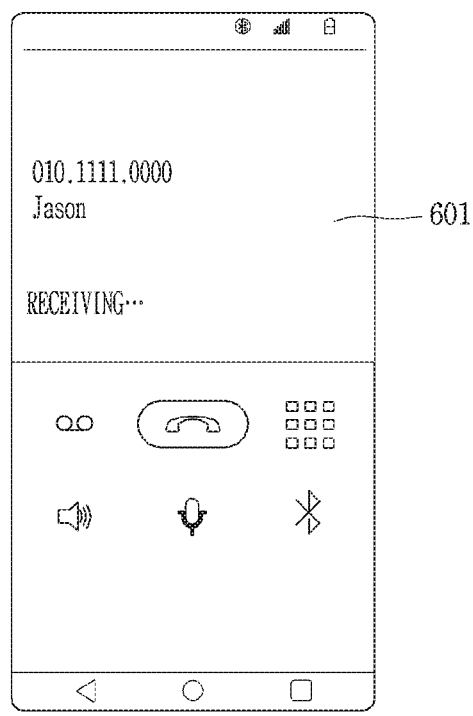
Figure 6C:
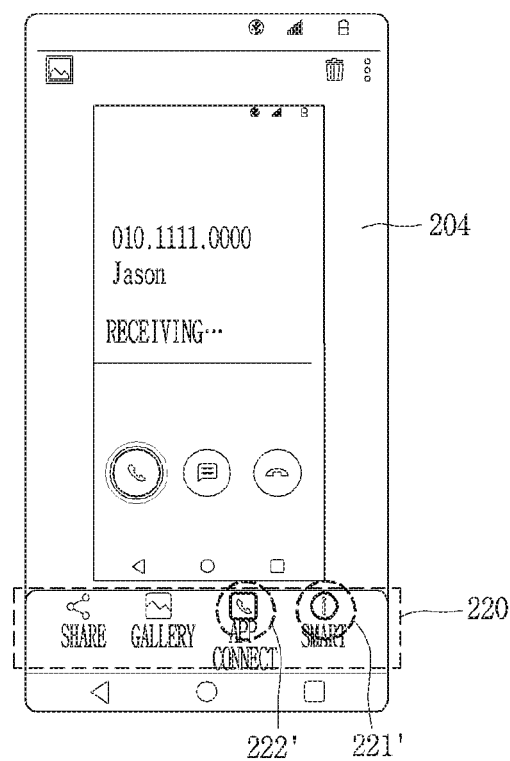

Referring to FIG. 6A, in the capture utilization mode, the phone application connection icon 221 is first designated as a function icon recommended for the captured call signal reception screen 204. Then, when the user of the terminal makes a call to an originator of an unanswered call signal (601), the function icon recommended for the captured call signal reception screen 204 is changed to a smart icon 221' at the time of entering the capture utilization mode next time. Then, the phone application connection icon may be demoted to a second recommendation icon 222' and thus may not be highlighted any more.

Figure 6D:
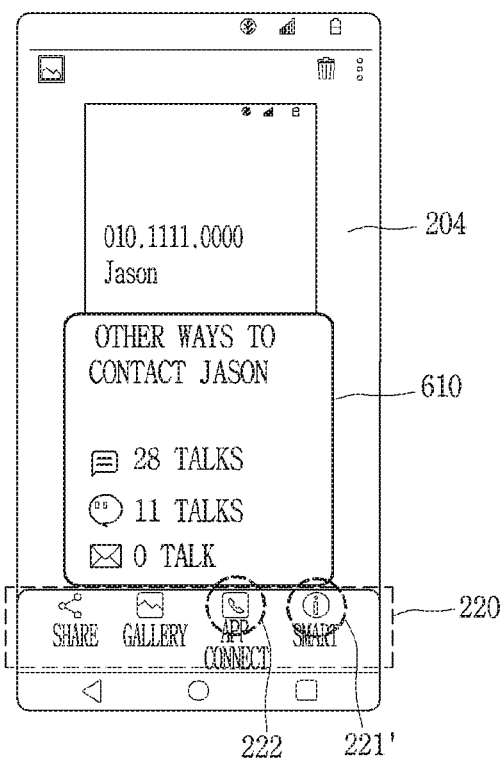

When the user selects the recommended smart icon 221' in the menu area 220, as illustrated in FIG. 6D, a window 610 including therein sub items (e.g., message, SNS, e-mail, etc.) recommending other methods of contacting the counterpart, except for the phone application connection 222, is displayed on the captured screen information 204.

Figure 5A:
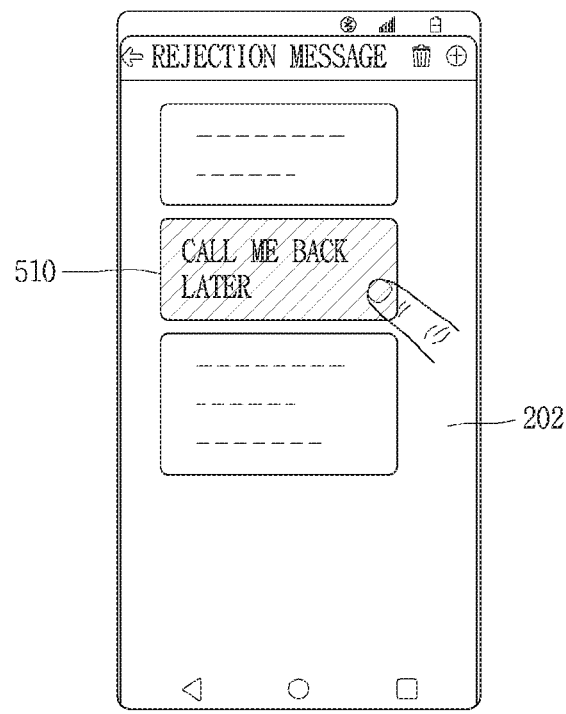
Figure 5B:
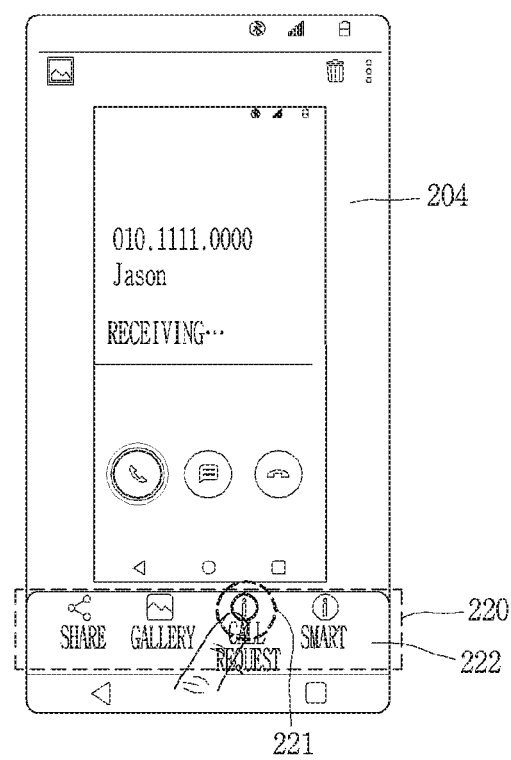
Figure 5C:
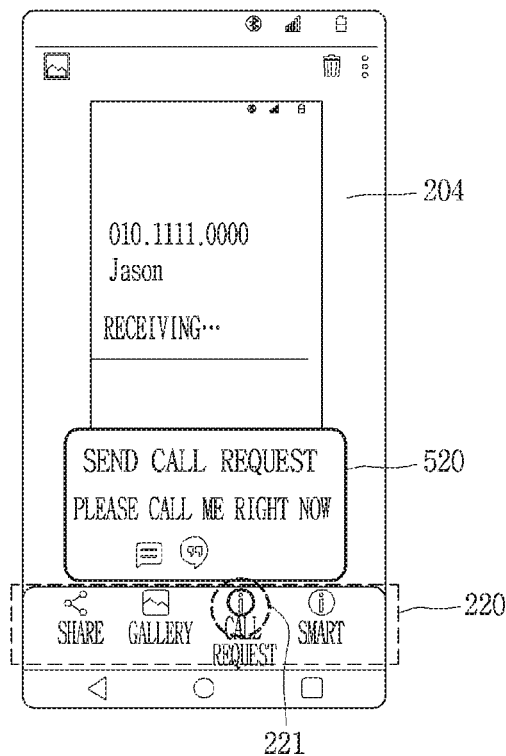

As another embodiment, FIGS. 5A, 5B, and 5C illustrate an example related to generating a variable menu to immediately execute a predicted next operation by detecting information included in a detected operation.

Referring to FIG. 5A, when a call rejection message 510 is transmitted after capturing a call signal reception, the controller 180 may detect and analyze information ('Call again') included in the call rejection message 510, confirm that the call rejection message is a message requesting the counterpart to call again, and generate a recommendation menu corresponding to the confirmation result upon entering the capture utilization mode. That is, at this time, 'call request icon' other than the phone application connection icon is presented as the recommendation icon 221, as illustrated in FIG. 5B. When the presented recommendation icon 221 is selected, sub-items (e.g., message, SNS) recommending call requesting methods are further provided on the captured screen information 204.

Figure 7A:
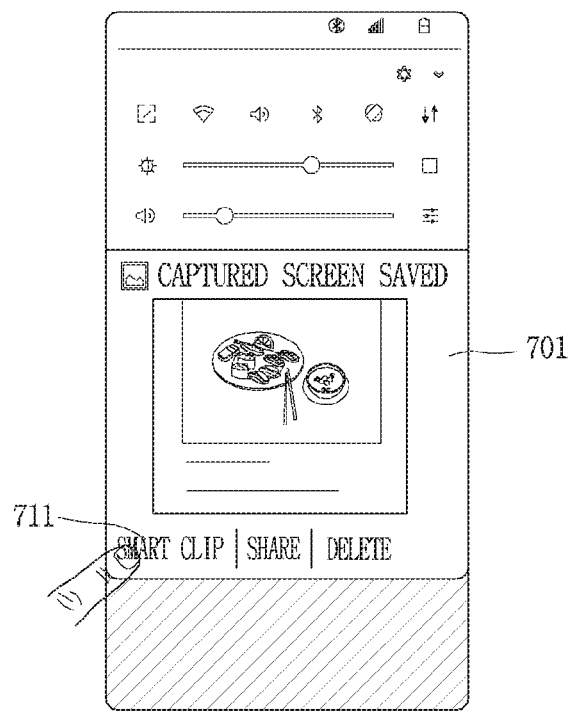
FIGS. 7A, 7B and 7C are exemplary conceptual views illustrating embodiments related to a method of entering a capture utilization mode and a method of releasing the entered capture utilization mode, in a mobile terminal according to the present invention.
Figure 7B:
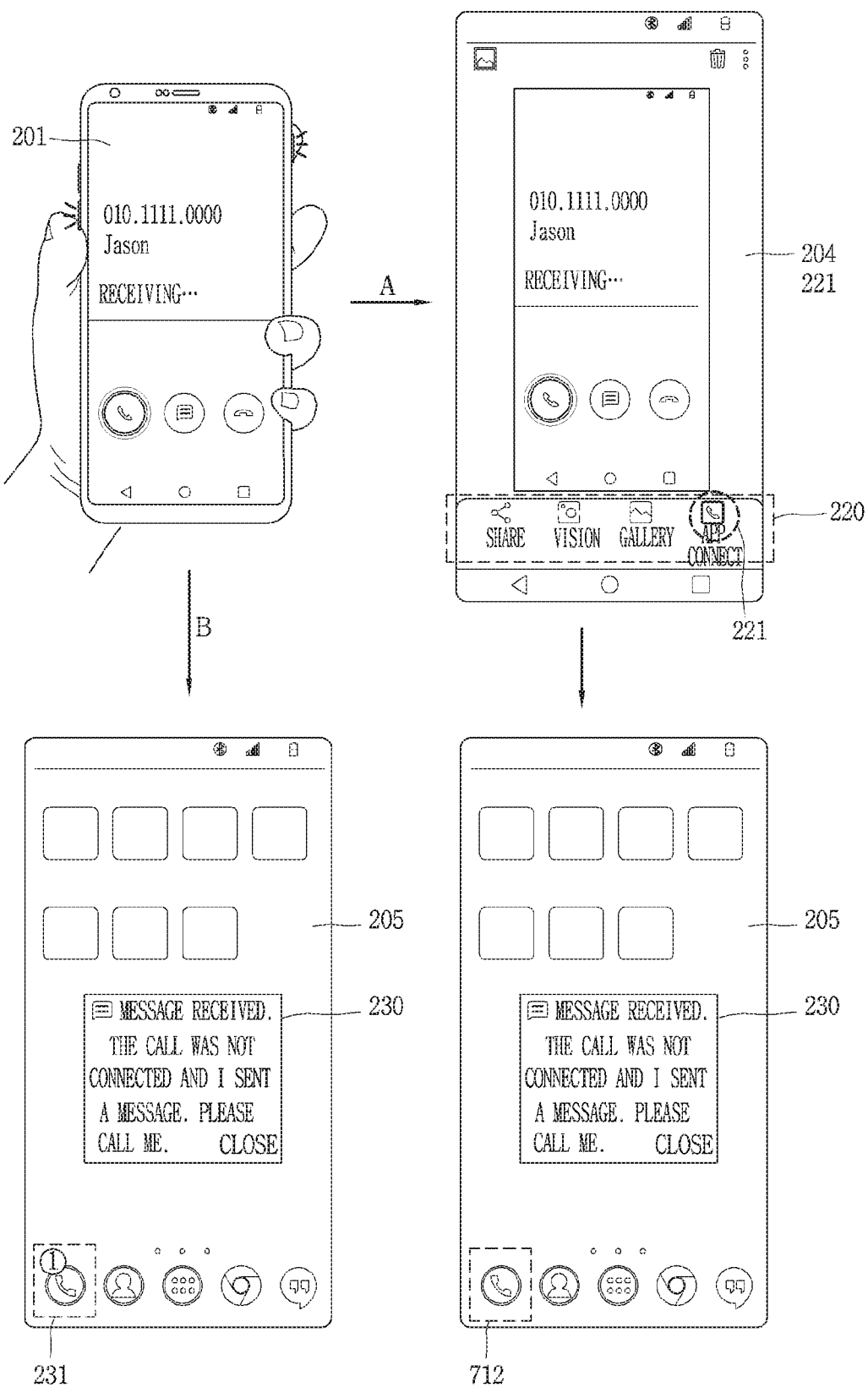
Figure 7C:
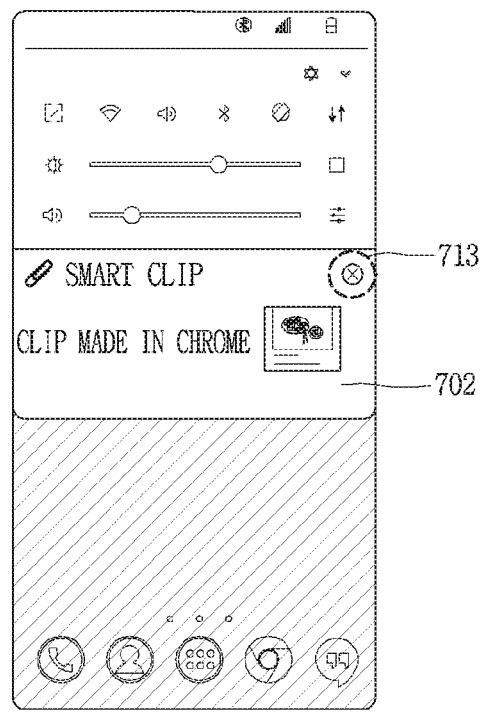

FIGS. 7A, 7B, and 7C illustrate detailed specific examples related to initial entry, re-entry, and release of entry with respect to the capture utilization mode.

The initial entry into the capture utilization mode, as illustrated in FIG. 7A, may be performed in a manner of performing screen capturing and selecting a menu (e.g., a smart clip) 711 for capture utilization displayed on a notification panel 701. That is, various menus related to utilization of information included in captured screen information are created at the time when the menu 711 for the capture utilization is selected.

In this manner, once the smart clip is created, as illustrated in FIG. 7C, the capture utilization mode may be accessed by touching an arbitrary point in an information display area 702 clipped in the notification panel. However, when a delete icon 713 provided at an upper right side of the clipped information display area 702 is touched, the capture utilization mode may not be performed for the captured screen information any more. In other words, the captured screen information can be used by entering the capture utilization mode at any time and at any place until before the delete icon 713 is selected intentionally.

In this way, accessibility to the captured screen information is enhanced by fixing the captured information to the notification panel. In other words, the captured screen information can immediately be accessed in any screen or even during any operation, and can be used at a required time point, namely, at a necessary moment.

On the other hand, the state that the capture utilization mode has been accessed may refer to that the corresponding information is processed as having confirmed by the user. This is because it is necessary to confirm a type of information before using the information.

In this regard, referring to FIG. 7B, when the call signal reception screen 201 is captured while the call signal is received through the wireless communication unit 110 of the mobile terminal 100, the confirmation of the unanswered call signal is not carried out only by the case. As illustrated in the drawing branched to B in FIG. 7B, even if a message is received from the originator of the call signal after the capture command, a notification badge 231 indicating presence of an unanswered call signal is displayed on the phone application connection icon.

On the other hand, when the capture utilization mode is accessed even once after capturing the call signal reception screen 201, as illustrated in the drawing branched to A in FIG. 7B, a phone application connection icon 712 without the notification badge is displayed on the home screen 205. That is, the reception of the unanswered call signal is processed as having confirmed.

The foregoing description has been given of various examples of generating the recommendation menu related to the captured screen information and the subsequent operation after the capture command. Hereinafter, description will be given in detail of examples of various methods of utilizing captured screen information in the capture utilization mode by using a plurality of menus provided in a manner of including a generated recommendation menu.

In this regard, FIGS. 8A, 8B, 8C, 8D, 9A, 9B, 10A, 10B, 11A, and 11B are conceptual views illustrating various embodiments related to a method of quickly executing an associated subsequent operation using a displayed varied menu in the capture utilization mode.

First, FIGS. 8A, 8B, 8C, and 8D illustrate different examples of execution results corresponding to selection of menus provided in the capture utilization mode. In the capture utilization mode, a specific menu is recommended according to a subsequent operation executed after a capture command, but the user does not have to select the recommended menu icon.

Figure 8A:
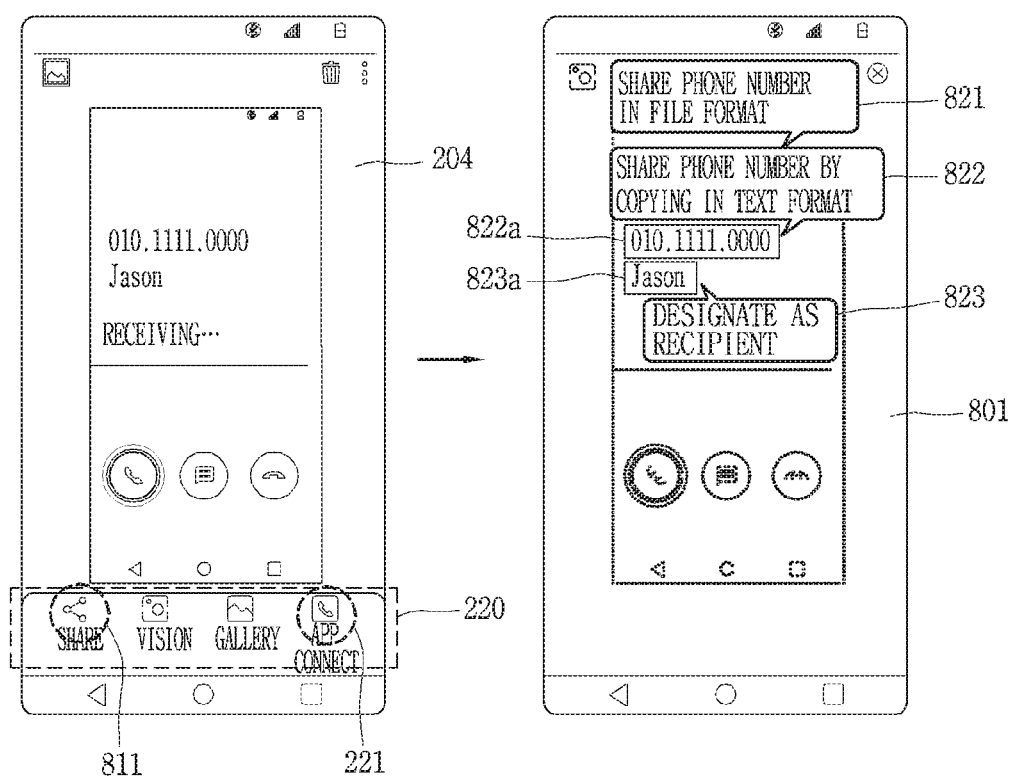
FIGS. 8A, 8B, 8C, 8D, 9A, 9B, 10A, 10B, 11A, and 11B are conceptual views illustrating various embodiments related to a method of fast executing the next associated function using a currently-displayed varied menu in a capture utilization mode, in a mobile terminal according to the present invention.

Specifically, as illustrated in FIG. 8A, among other function icons which may appear by applying an up/down or left/right flicking input to the menu area 220 displayed in the capture utilization mode, for example, a share icon 811 may be selected as a first function icon other than a recommendation icon.

When a specific icon is selected in the capture utilization mode, the controller 180 may extract information related to an execution of a function corresponding to the selected specific icon from the captured screen information. In addition, the controller 180 displays a sub-function icon corresponding to the extracted information at a position corresponding to the captured screen information.

As the share icon 811 is selected in FIG. 8A, sub function icons 821, 822, and 823 corresponding to the share icon 811 may be displayed in the form of speed bubble in the vicinity of positions 822a and 823a where shareable information (e.g., call number, a recipient) is displayed within a captured call signal reception screen 801. At this time, the sub function icons 821, 822, and 823 may correspond to different sharing methods. When one of the displayed sub-function icons 821, 822, and 823 is selected, contact information related to a call signal originator is shared in a corresponding sharing manner. That is, in this case, the captured screen information itself is not shared, but extracted information is transmitted to a third-party terminal in the form of text, file, or the like.

Figure 8B:
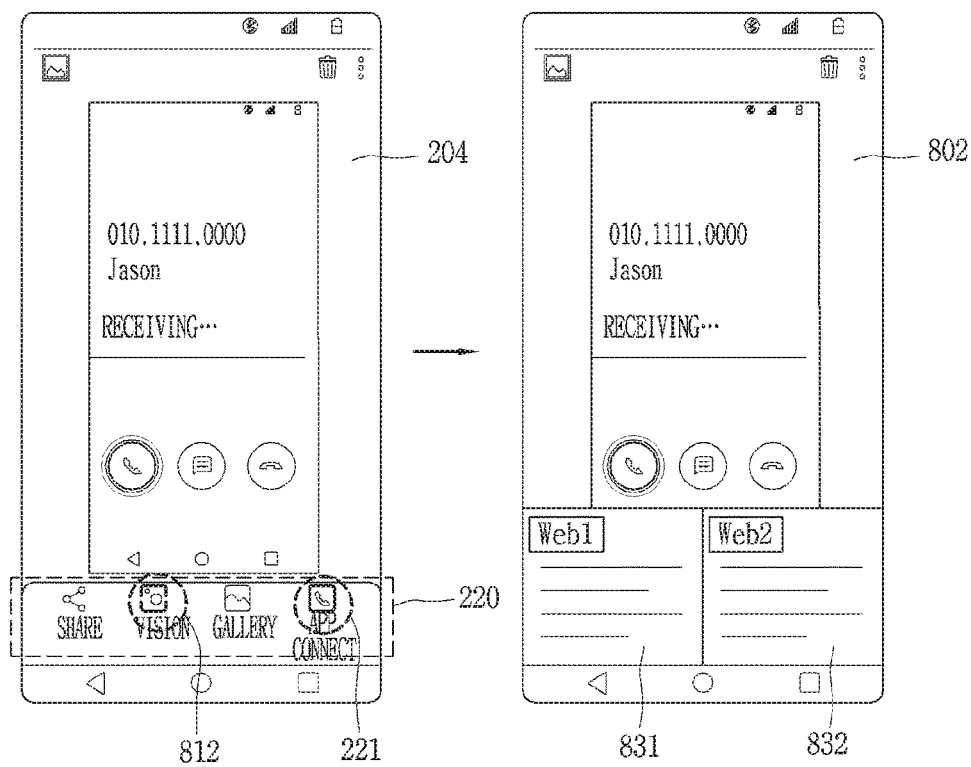
Figure 8C:
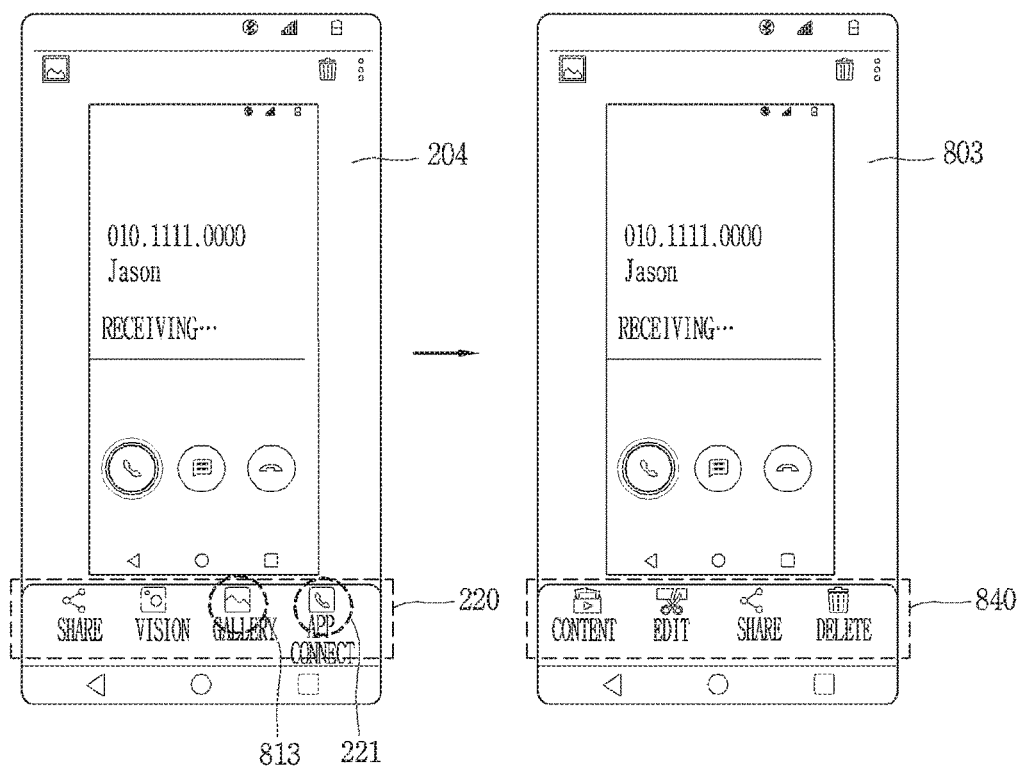
Figure 8D:
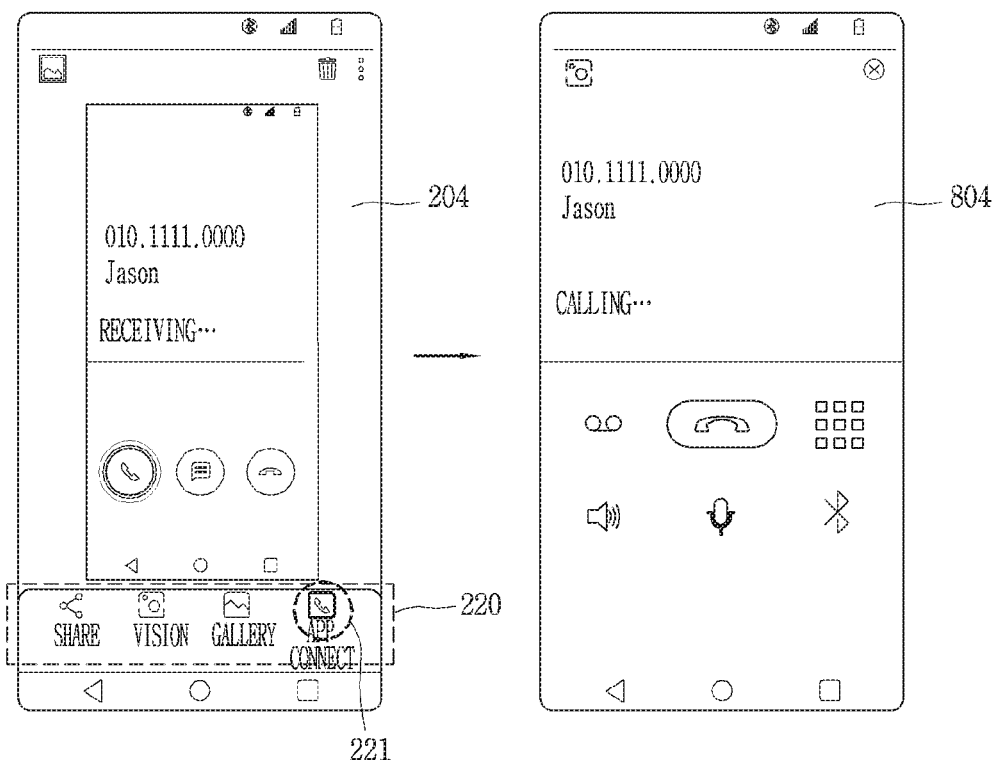

As another example, FIGS. 8B to 8D illustrate examples of immediately accessing another application corresponding to captured screen information upon menu selection.

For example, referring to FIG. 8B, when a vision search icon 812 is selected rather than the recommendation icon 221 in the menu area 220 of the capture utilization mode, a web application is accessed and web search results 831 and 832 related to a captured call signal reception screen are provided together with captured screen information 802. As another example, referring to FIG. 8C, when a gallery icon 813 presented in the menu area 220 is selected, a gallery application is accessed and an editing mode for captured screen information 803 is carried out. Accordingly, an associated editing toolbox 840 may be provided at a bottom of the captured screen information 803. As another example, referring to FIG. 8D, in response to a selection of an App connection icon which is the recommendation icon 221 within the menu area 220, a phone application may be accessed to immediately place a call to the call signal originator (804).

Meanwhile, in one embodiment, an operation associated with captured screen information may be detected based on a comparison result between first information included in the captured screen information and second information corresponding to an event generated in at least one application.

Figure 9A:
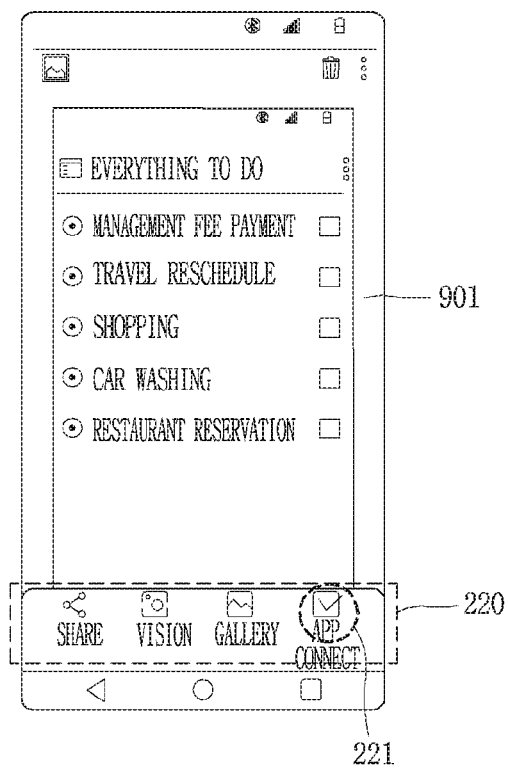

In this regard, when a capture utilization mode is executed after capturing screen information including schedule information, as illustrated in FIG. 9A, a schedule application connection icon is first designated and displayed as the recommendation icon 221. Thereafter, the change in at least part of schedule information displayed on a captured schedule screen 901 may be detected through various information collected from applications installed in the terminal.

For example, the controller 180 may recognize completion of a thing to do, for example, 'Restaurant reservation' ('first information') in FIG. 9A by comparing 'Restaurant reservation' (the first information) with a reservation confirmation message ('second information') received from the restaurant through a message application. In addition, the controller 180 may recognize completion of another thing to do, for example, 'payment of management fee' ('first information') by matching the first information with a management fee transfer result message ('second information') received from a bank application in which an automatic transfer for the management fee has been set. The completion of the thing to do may be recognized as a subsequent operation detected after the capture command. Alternatively, the controller may recognize an addition of a new thing to do according to an operation made in an installed application although not included in the first information, and recognize it as a subsequent operation.

Figure 9B:
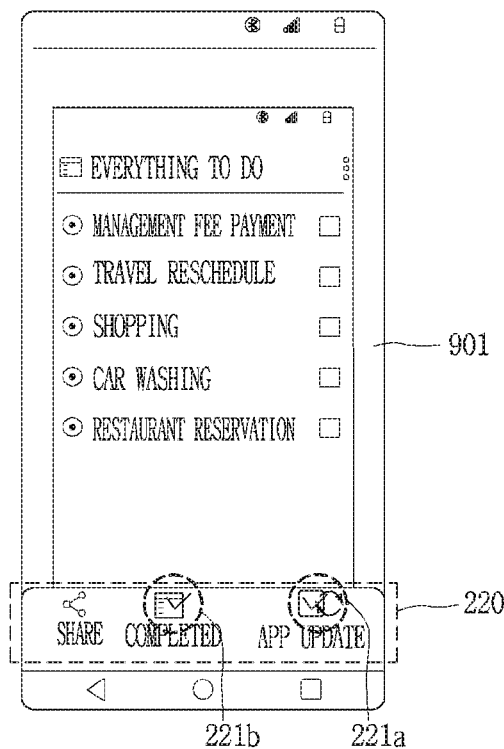

Accordingly, as illustrated in FIG. 9B, a function icon for confirming completed tasks and a function icon for updating applications may be designated as recommendation icons 221a and 221b, respectively. That is, the recommendation icons are changed from the schedule application connection icon to the completed task confirmation/application update icon.

In one embodiment, information included in screen information captured in a manner varied according to an operation state of a currently-executed application may be utilized in the capture utilization mode.

Specifically, when an application associated with the information included in the captured screen information is executed at a background and the entry into the capture utilization mode is detected, the controller 180 may output the information included in the captured screen information to correspond to an operation state of the application executed at the background, in response to a selection of a varied menu.

Figure 10A:
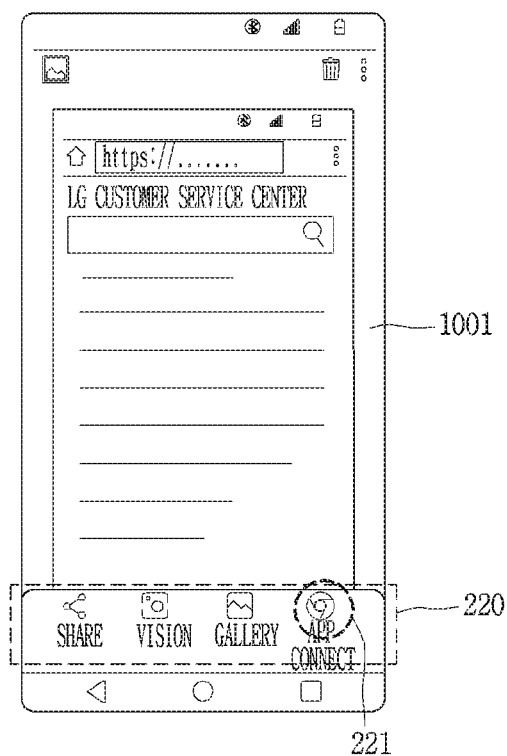

For example, referring to FIG. 10A, when entering the capture utilization mode after capturing manual information searched in a web application, an App connection icon to connect to a position of a web application corresponding to a captured web page 1001 based on URL information saved at the time of capturing the web page 1001 is designated as the recommendation icon 221.

Figure 10B:
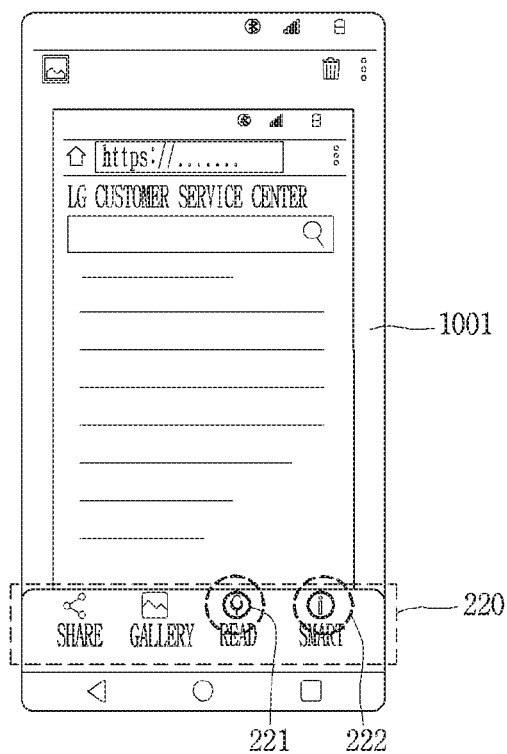

However, when an application associated with the captured web page 1001 is being executed as a subsequent operation at the background, information included in the captured web page 1001 may be used in the application running at the background. For example, as illustrated in FIG. 10B, a read icon may be provided as the recommendation icon 221 in the menu area 220. Accordingly, a problem can be solved according to manual information provided by voice when the application currently executed at the background is executed at a foreground.

As another example, when a sound source/movie is being played back in the application running at the background, a popup view icon may be provided as the recommendation icon 221 in place of the read icon. That is, a different function icon may be generated and recommended depending on an operation state of an application corresponding to a detected subsequent operation. Accordingly, the information included in the captured screen information can be utilized in a form more suitable for a situation.

Figure 11A:
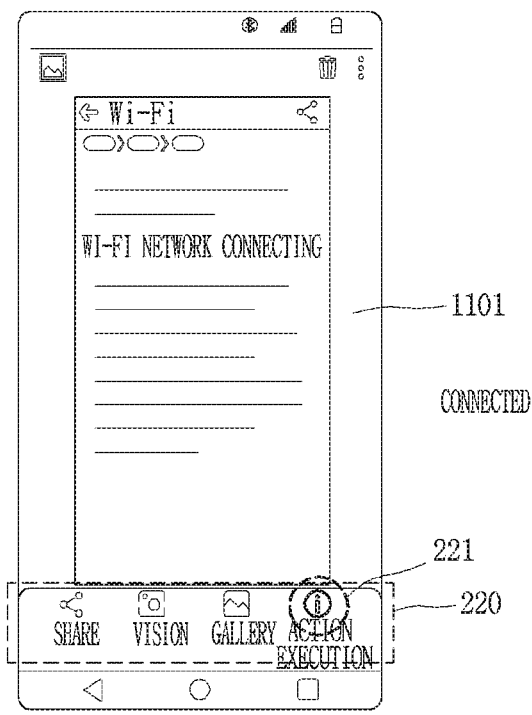
Figure 11B:
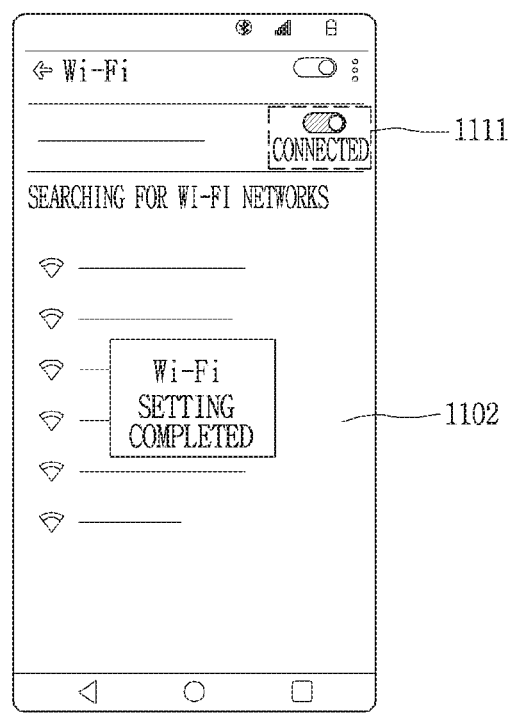

As another example, FIGS. 11A and 11B illustrate a specific example of rapidly executing an associated subsequent operation using a displayed varied menu in a capture utilization mode.

In detail, when an entry into a capture utilization mode is detected in a state that an application corresponding to captured manual information is executed, the setting of the terminal may be changed to correspond to the manual information, in response to a selection of a menu provided together with the captured screen information.

For example, Wi-Fi connection manual information is captured in a setup application of the terminal. Afterwards, when the entry into the capture utilization mode is detected in a state that the setup application is executed at the background, as illustrated in FIG. 11A, an action execution icon may be designated as the recommendation icon 221. When a touch is applied to the action execution icon presented in the menu area 220, the terminal may be set according to the Wi-Fi connection manual information. As a result, as illustrated in FIG. 11B, Wi-Fi is automatically connected (1111), and a setup screen 1102 in which a notification indicating that the Wi-Fi has been completely set according to the manual information is output is displayed. According to this, the setting change is automatically performed without having to perform an additional operation according to the manual information read out by the user.

However, in order to prevent an unintended setting change, the change of the setting of the terminal may be performed through the user's feedback or may be limited to a case of quick help/manual/help provided in the terminal.

Figure 12A:
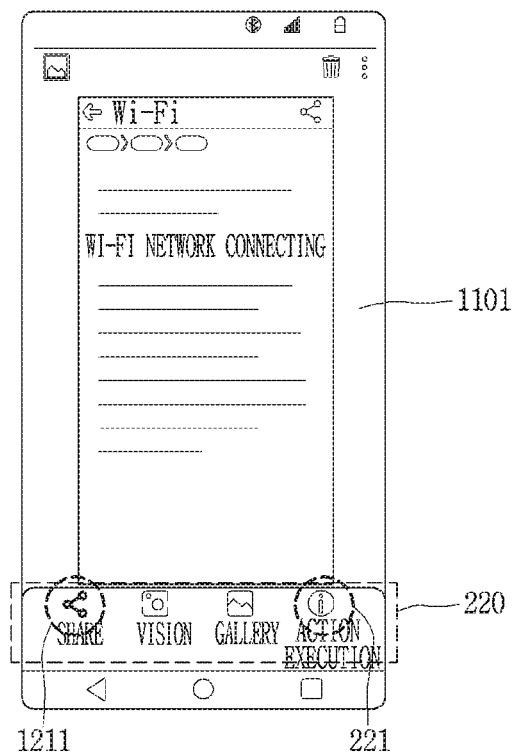
FIGS. 12A, 12B, and 12C are conceptual views illustrating a method of sharing an execution of an operation associated with captured screen information with an external terminal in a mobile terminal according to the present invention.
Figure 12B:
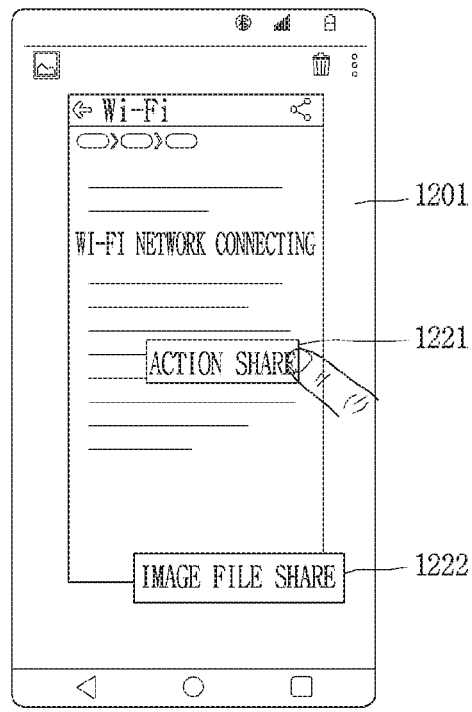
Figure 12C:
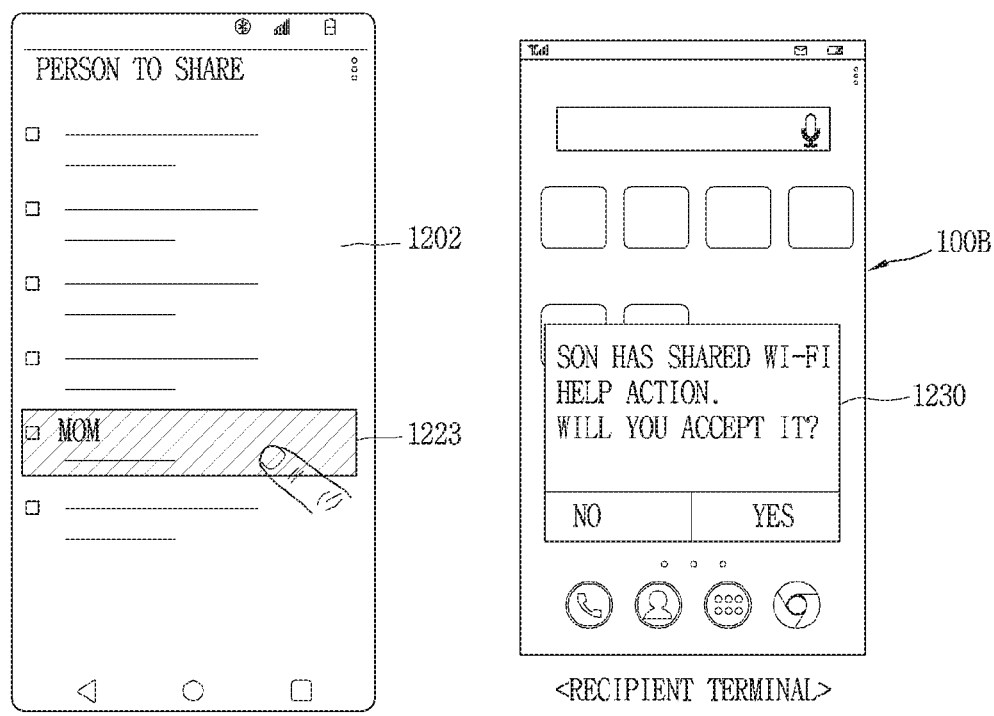

Meanwhile, FIGS. 12A, 12B, and 12C illustrate an example of a method of sharing an execution of an operation associated with captured screen information with an external terminal.

To this end, when an operation sharing request is detected in a capture utilization mode, the controller 180 may transmit to an external terminal a request for changing setting of the external terminal to correspond to captured manual information. At this time, the external terminal may be limited to a terminal corresponding to contact information stored in a phone book of the terminal. Further, an execution of a setting change according to the manual information may be performed based on a feedback response from an external terminal user to the operation sharing request.

In an example, as illustrated in FIG. 12A, in the capture utilization mode, when a sharing icon 1211 (not illustrated) other than the recommendation icon 221 is selected in the menu area 220 provided together with a captured Wi-Fi connection manual screen 1101, as illustrated in FIG. 12B, sub icons 1221 and 1222 indicating sharing methods are displayed within a captured manual screen 1201.

When an action sharing icon 1221 is selected, the controller 180 may output a contact list 1202 for designating a counterpart to share on the display unit 151. When contact information 1223 related to a counterpart to share (e.g., Mom) is selected in the contact list 1202, the controller 180 transmits a request for changing Wi-Fi setting of a terminal of the counterpart according to manual information through the wireless communication unit 110. As a result, as illustrated in a right side of FIG. 12C, a popup window 1230 for inquiring whether or not to permit sharing is output on a display unit of the counterpart terminal (i.e., recipient terminal) 100B. The Wi-Fi setting of the recipient terminal 100B may be changed to correspond to the manual information through the wireless communication unit 110, on the basis of the response to the popup window 1230 received from the recipient terminal 100B.

Next, FIGS. 13A, 13B, 13C, 13D, 13E, 13F, 14A, 14B, 14C, and 14D are conceptual views illustrating different embodiments related to a method of changing and controlling captured screen information in response to information associated with the captured screen information being updated, in a mobile terminal according to the present invention.

Specifically, the controller 180 may detect update information generated in an application corresponding to captured screen information. The controller 180 changes the captured screen information based on the update information according to selection of a menu provided in the capture utilization mode. In other words, here, the change refers to changing the initially-captured screen information itself.

Figure 13A:
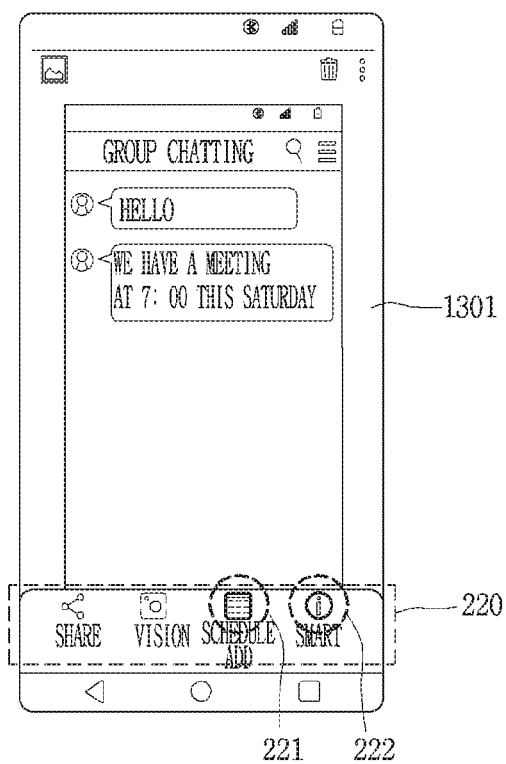
FIGS. 13A, 13B, 13C, 13D, 13E, 13F, 14A, 14B, 14C, and 14D are conceptual views illustrating different embodiments related to a method of changing and controlling captured screen information in response to information associated with the captured screen information being updated, in a mobile terminal according to the present invention.

In this regard, referring to FIG. 13A, when a message screen in which messages are exchanged with a counterpart is captured, the controller 180 extracts and analyzes message contents included in the captured message screen. Then, when entering the capture utilization mode, the controller 180 displays a schedule addition icon, which is generated based on the extracted and analyzed message contents (e.g., 'meeting at 7:00 this Saturday') together with the captured message screen 1301, as the recommendation icon 221 in the menu area 220.

Figure 13B:
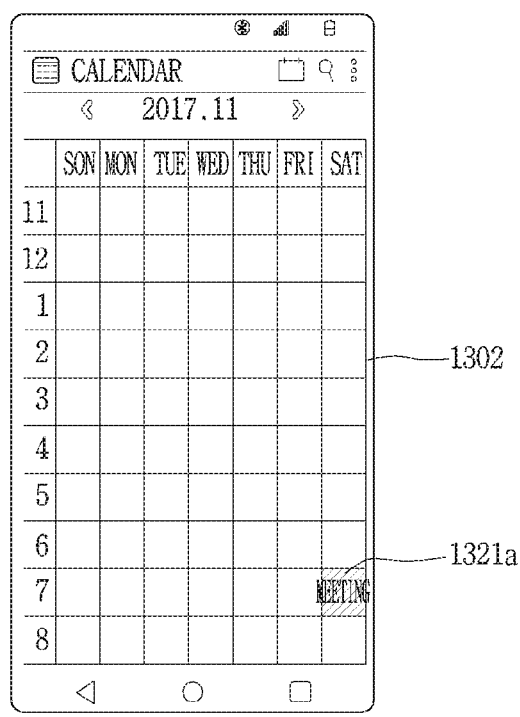
Figure 13C:
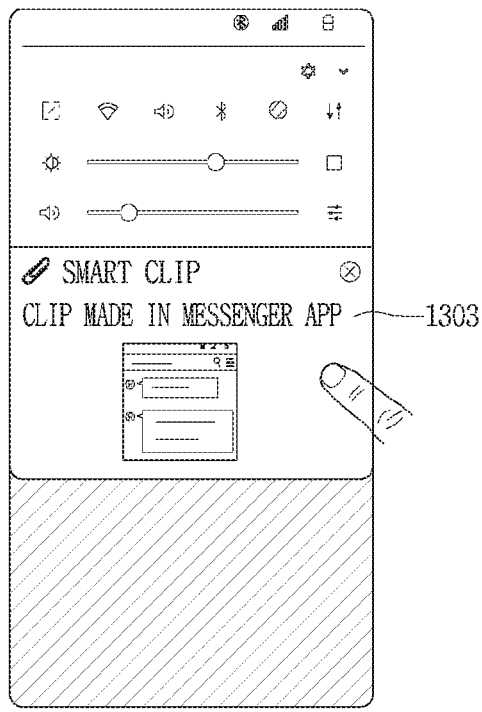

When the schedule addition icon 221 is selected, the controller 180, as illustrated in FIG. 13B, executes a calendar application and displays a schedule, which corresponds to the message contents extracted from the captured message screen, at a position corresponding to the calendar screen 1302. The displayed schedule 1321a is confirmed in response to a reception of a save command.

Next, when messages exchanged with the counterpart are further added, the controller 180 may detect the added messages as update information.

Figure 13D:
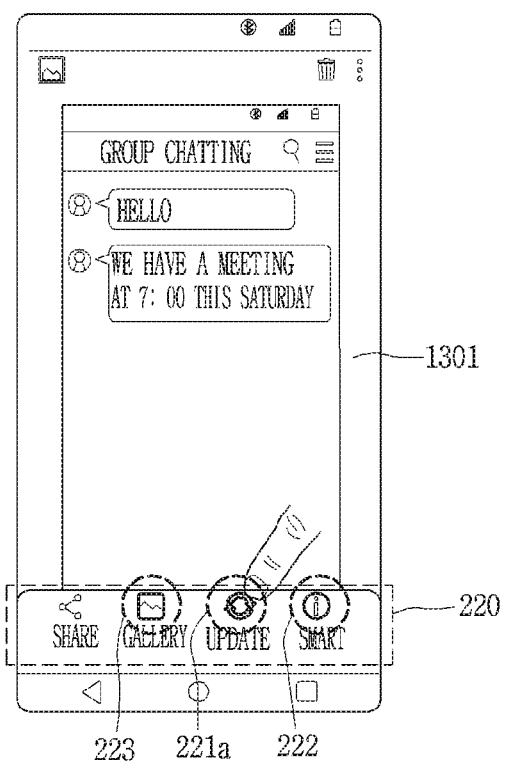

Thereafter, when entering the capture utilization mode again through a notification panel 1303 (FIG. 13C), an update icon 221a is designated as the recommendation icon for the captured message screen as illustrated in FIG. 13D. At this time, the menu area 220 may be continuously provided together with an icon 222 which has been provided in the initial capture utilization mode, or a provided icon ('vision search icon') may be replaced with another function icon 223 which has not been provided.

Figure 13E:
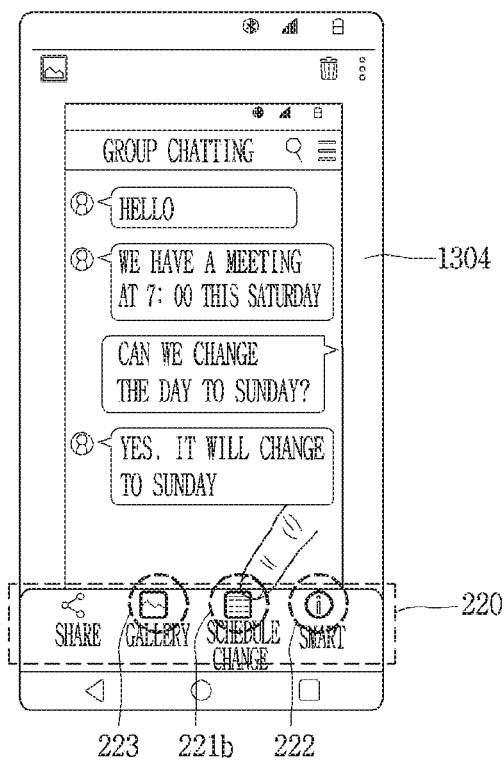
Figure 13F:
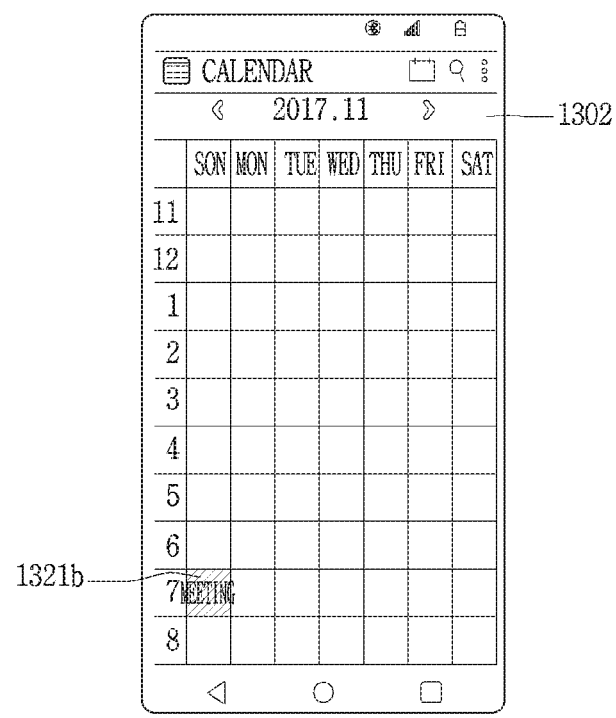

Next, when a touch is applied to the recommended update icon 221a, the added messages detected by the controller 180 as the update information are included in a captured message screen 1304 as illustrated in FIG. 13E. This can be implemented in any of a way of adding update information into a previously captured screen or a way of replacing the previously captured screen with a latest screen including the update information.

In response to the captured message screen being updated (1304), the controller 180 extracts and analyzes the updated information and recommends a corresponding menu, for example, a schedule change icon 221b, in the menu area 220. When a touch is applied to the varied menu, that is, the schedule change icon 221b, the controller 180 executes the calendar application and then displays a changed schedule 1321b on the calendar screen 1302.

On the other hand, as another example, FIGS. 14A, 14B, 14C, and 14D illustrate an example in which a screen including updated information is provided together with captured screen information in a capture utilization mode, so as to further enhance convenience of the user.

In detail, the controller 180 of the mobile terminal 100 detects updated information in an application corresponding to captured screen information and provides an execution screen including the updated information together with the captured screen information and a first menu in the capture utilization mode. Thereafter, the controller 180 may change the previous first menu to a second menu associated with the updated information in response to the execution screen being selected in the capture utilization mode.

Figure 14A:
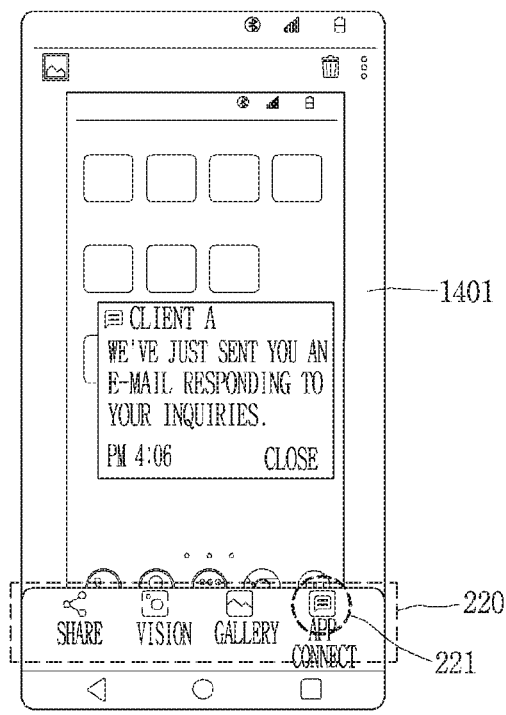

For example, when entering the capture utilization mode after capturing a message arrival notification, as illustrated in FIG. 14A, a message application connection icon 221 is recommended together with a captured message notification screen 1401.

Figure 14B:
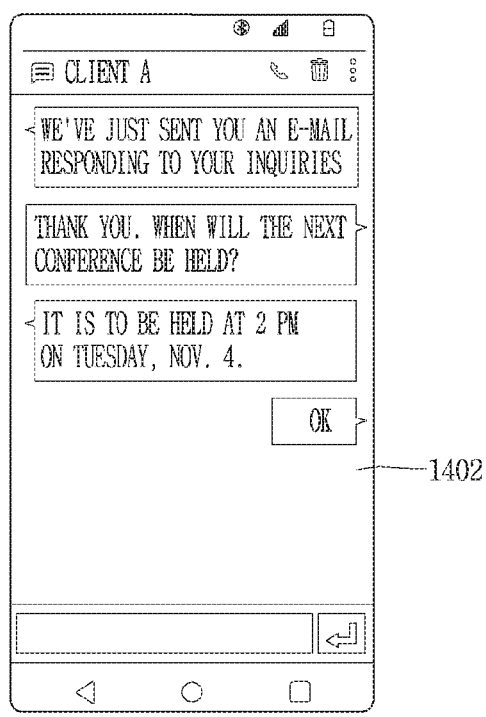
Figure 14C:
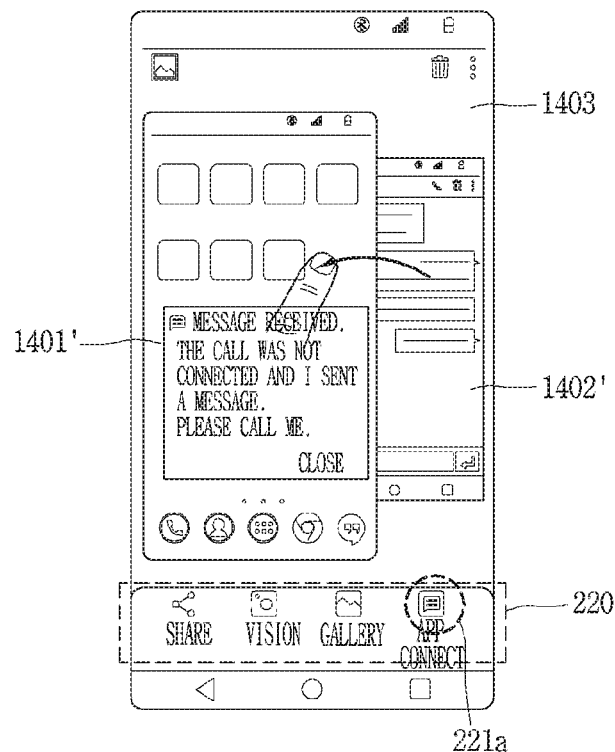

Thereafter, as illustrated in FIG. 14B, a subsequent operation 1402 in which messages are exchanged with a counterpart that has transmitted a message corresponding to the captured screen information 1401 is detected. When the capture utilization mode is accessed again, as illustrated in FIG. 14C, a screen area 1403 in which captured screen information 1401' in a varied size and the last/latest message screen 1402' are displayed together is output.

Figure 14D:
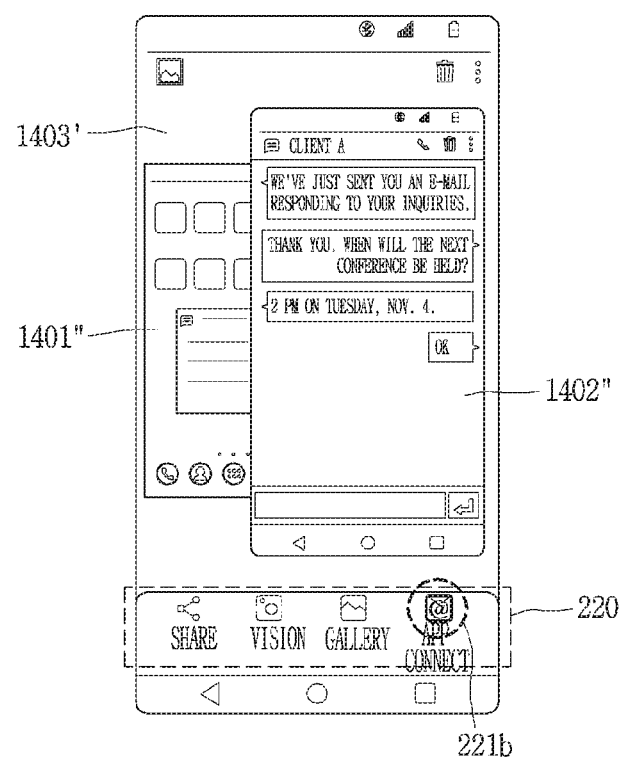

At this time, a display order of the varied captured screen information 1401' and the last/latest message screen 1402' may change by applying a touch gesture to the screen area 1403 without selecting the recommendation icon 221a provided in the menu area 220. For example, when a touch applied to the last/latest message screen 1402' disposed at the rear side as illustrated in FIG. 14C is dragged to the varied captured screen information 1401', the display orders of the screens are switched as illustrated in FIG. 14D (1401" and 1402"). At the same time, a menu recommended in the menu area 220 is also varied and displayed based on information included in the switched last/latest message screen 1402". Accordingly, an email application connection icon 221b for executing a subsequent operation predicted based on information included in exchanged messages is recommended in the menu area 220.

Meanwhile, although not illustrated, when there is updated information related to the captured screen information and the updated information is captured again, the previously captured screen information may be automatically deleted.

In addition, when there is too many captured screen information, a scroll operation should be performed several times in order to directly access the capture utilization mode through a notification panel. Therefore, only a trigger area for entering the capture utilization mode is provided in the notification panel, the captured screen information may be dragged to left/right/up/down after entering the capture utilization mode, so as to access another captured screen information and varied menu.

As described above, in a mobile terminal and a method of operating the same according to embodiments of the present invention, the next operation predicted according to a subsequent operation generated after an input of a capture command can be recommended in the form of menu together with a captured screen, thereby maximizing utilization of captured screen information. In addition, by improving accessibility to a captured screen, information included in the captured screen can be quickly executed to correspond to an additional operation when an additional operation is detected.

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. Therefore, it should also be understood that the above-described embodiments are not limited by any of the details of the foregoing description, unless otherwise specified, but rather should be construed broadly within its scope as defined in the appended claims, Therefore, all changes and modifications that fall within the metes and bounds of the claims, or equivalents of such metes and bounds are therefore intended to be embraced by the appended claims.

What is claimed is:

1. A mobile terminal, comprising:
a display to display screen information;
a user input unit to receive a capture command; and
a controller configured to:
capture the screen information according to the capture command and detect an operation associated with the captured screen information;
enter a capture utilization mode and cause the display to display a menu that is changed based on the detected operation and the captured screen information together in the capture utilization mode; and
detect information included in the detected operation and generate the changed menu such that a next operation predicted based on the detected information is executed in the capture utilization mode,
wherein the changed menu comprises a menu icon mapped to the next operation predicted to be executed in the capture utilization mode, following the detected operation, and
wherein the menu icon mapped to the next operation is displayed visually distinguishably from other menu icons included in the changed menu such that the visually distinguishable menu icon is recommended to a user.

2. The terminal of claim 1, wherein a plurality of function icons associated with utilization of the captured screen information is included in the capture utilization mode, and
wherein the changed menu is displayed in a form that at least one of the plurality of function icons is recommended according to the detected operation.

3. The terminal of claim 1, wherein the operation associated with the captured screen information includes an event occurred in an application associated with the captured screen information.

4. The terminal of claim 1, wherein, when an additional operation associated with the captured screen information is detected after the captured screen information and a first menu are displayed in the capture utilization mode, the controller is configured to output a second menu changed based on the detected additional operation together with the captured screen information in the capture utilization mode.

5. The terminal of claim 4, wherein the additional operation associated with the captured screen information includes an operation in which a specific function is executed in response to a selection of the first menu or the second menu in the capture utilization mode.

6. The terminal of claim 4, wherein each of the first menu and the second menu includes a plurality of function icons, and
wherein a function icon recommended in the first menu is different from a function icon recommended in the second menu.

7. The terminal of claim 1, further comprising a wireless communication unit to receive a call signal,
wherein the controller is configured to capture screen information on which a call signal is received according to the capture command, and when the entry into the capture utilization mode is detected after the reception of the call signal is processed as being unanswered, to confirm the unanswered call signal.

8. The terminal of claim 1, wherein the controller is configured to extract information related to an execution of the changed menu from the captured screen information when the changed menu is selected in the capture utilization mode, and cause the display to display a sub-function icon corresponding to the extracted information at a corresponding position of the captured screen information.

9. The terminal of claim 1, wherein the operation associated with the captured screen information is detected based on a comparison result between first information included in the captured screen information and second information corresponding to an event occurred in at least one application.

10. The terminal of claim 1, wherein, when an application associated with information included in the captured screen information is executed and the entry into the capture utilization mode is detected, the controller is configured to cause the display to display the information included in the captured screen information to correspond to an operation state of an execution screen of the application, in response to a selection of the changed menu.

11. The terminal of claim 1, wherein the captured screen information includes manual information, and
   wherein the controller is configured to execute an operation of changing setting of the terminal to correspond to the manual information, in response to a selection of the changed menu, when the entry into the capture utilization mode is detected in an executed state of an application corresponding to the manual information.

12. The terminal of claim 11, further comprising a wireless communication unit to transmit a signal to an external terminal,
   wherein the controller is configured to detect reception of an operation sharing request in the capture utilization mode, and cause the wireless communication unit to transmit to the external terminal, a request signal for changing setting of the external terminal to correspond to the manual information.

13. The terminal of claim 1, wherein the controller is configured to detect updated information in an application corresponding to the captured screen information, and to change the captured screen information based on the updated information, in response to a selection of the changed menu in the capture utilization mode.

14. The terminal of claim 1, wherein the controller is configured to detect updated information in an application corresponding to the captured screen information, to provide an execution screen including the updated information together with the captured screen information and a first menu in the capture utilization mode, and to change the first menu to a second menu associated with the updated information in response to a selection of the execution screen.

15. A method for operating a mobile terminal, the method comprising:
   displaying screen information;
   capturing the screen information according to a capture command;
   detecting an operation associated with the captured screen information;
   entering a capture utilization mode and displaying a menu, which is changed based on the detected operation, and the captured screen information together in the capture utilization mode; and
   detecting information included in the detected operation and generating the chaged menu such that a next operation predicted based on the detected information is executed in the capture utilization mode,
   wherein the changed menu comprises a menu icon mapped to the next operation predicted to be executed in the capture utilization mode, following the detected operation, and
   wherein the menu icon mapped to the next operation is displayed visually distinguishably from other menu icons included in the changed menu such that the visually distinguishable menu icon is recommended to a user.

* * * * *